United States Patent
Russell, II et al.

(10) Patent No.: US 11,437,156 B2
(45) Date of Patent: Sep. 6, 2022

(54) UNIVERSAL INVERTED REACTOR

(71) Applicant: BWXT Nuclear Energy, Inc., Lynchburg, VA (US)

(72) Inventors: William E. Russell, II, Charlotte, NC (US); Joshua J. Bergman, Charlotte, NC (US); Jonathan W. Cirtain, Charlotte, NC (US); Craig D. Gramlich, Charlotte, NC (US); James B. Inman, Charlotte, NC (US); Matthew P. Levasseur, Charlotte, NC (US); Joseph K. Miller, Charlotte, NC (US); Ryan Z. Ziegler, Charlotte, NC (US)

(73) Assignee: BWXT Nuclear Energy, Inc., Lynchburg, VA (US)

( * ) Notice: Subject to any disclaimer, the term of this patent is extended or adjusted under 35 U.S.C. 154(b) by 515 days.

(21) Appl. No.: 16/446,663

(22) Filed: Jun. 20, 2019

(65) Prior Publication Data
US 2020/0027585 A1    Jan. 23, 2020

Related U.S. Application Data

(60) Provisional application No. 62/688,255, filed on Jun. 21, 2018.

(51) Int. Cl.
*G21C 5/02* (2006.01)
*G21C 5/14* (2006.01)
(Continued)

(52) U.S. Cl.
CPC .............. *G21C 5/02* (2013.01); *G21C 5/14* (2013.01); *B33Y 50/00* (2014.12); *B33Y 80/00* (2014.12);
(Continued)

(58) Field of Classification Search
CPC ... G21C 3/02; G21C 3/04; G21C 5/02; G21C 5/14; G21C 5/16; G21C 5/18;
(Continued)

(56) References Cited

U.S. PATENT DOCUMENTS 2,992,981 A * 7/1961 Thomson ................. G21D 5/02
                                                    376/318
3,105,036 A * 9/1963 Puechl ..................... G21C 7/02
                                                    376/346
(Continued)

FOREIGN PATENT DOCUMENTS

EP        3010024 B1    8/2017
JP     2016-045095 A    4/2016
(Continued)

OTHER PUBLICATIONS

Wong et al., "A Review of Additive Manufacturing", International Scholarly Research Network, ISRN Mechanical Engineering, vol. 2012, Article ID 208760, pp. 1-10.
(Continued)

*Primary Examiner* — Jack W Keith
*Assistant Examiner* — Jinney Kil
(74) *Attorney, Agent, or Firm* — Morgan, Lewis & Bockius LLP

(57) ABSTRACT

Fission reactor has a shell encompassing a reactor space within which are a central longitudinal channel, a plurality of axially extending rings with adjacent rings defining an annular cylindrical space in which a first plurality of primary axial tubes are circumferential located. Circumferentially adjacent primary axial tubes are separated by one of the plurality of secondary channels and a plurality of webbings connects at least a portion of the plurality of primary axial tubes to adjacent structure. A fissionable nuclear fuel composition is located in at least some of the plurality of (Continued)

secondary channels and a primary coolant passes thorough at least some of the primary axial tubes. Additive and/or subtractive manufacturing techniques produce an integral and unitary structure for the fuel loaded reactor space. During manufacturing and as-built, the reactor design can be analyzed using a computational platform that integrates and analyzes data from in-situ monitoring during manufacturing.

21 Claims, 17 Drawing Sheets

(51) Int. Cl.
    *G21C 3/326*     (2006.01)
    *G21C 3/18*     (2006.01)
    *B33Y 80/00*     (2015.01)
    *B33Y 50/00*     (2015.01)
    *G21C 21/02*     (2006.01)

(52) U.S. Cl.
    CPC .............. *G21C 3/18* (2013.01); *G21C 3/3267* (2019.01); *G21C 21/02* (2013.01)

(58) Field of Classification Search
    CPC ........ G21C 13/02; G21C 15/02; G21C 15/04; G21C 15/06; G21C 15/22
    USPC ........ 376/347, 361, 374, 396, 431, 453, 918
    See application file for complete search history.

(56) References Cited

U.S. PATENT DOCUMENTS

| | | |
|---|---|---|
| 3,286,107 A | 11/1966 | Fein et al. |
| 3,387,148 A | 6/1968 | Janner et al. |
| 3,449,208 A * | 6/1969 | Cohen .................... G21C 15/00 376/361 |
| 4,085,004 A | 4/1978 | Fletcher et al. |
| 5,408,510 A | 4/1995 | Ball et al. |
| 8,229,871 B2 | 7/2012 | Woolf et al. |
| 9,643,152 B2 | 5/2017 | Cronin |
| 2012/0020446 A1 | 1/2012 | Hyde et al. |
| 2014/0185733 A1 | 7/2014 | Povirk et al. |
| 2014/0334595 A1 | 11/2014 | Bashkirtsev et al. |
| 2015/0228363 A1 | 8/2015 | Dewan et al. |
| 2017/0263345 A1 | 9/2017 | Venneri et al. |
| 2018/0025797 A1 | 1/2018 | van Rooyen et al. |
| 2018/0033501 A1 * | 2/2018 | Kimura .................... G21C 3/22 |
| 2018/0264679 A1 | 9/2018 | van Rooyen et al. |

FOREIGN PATENT DOCUMENTS

| | | |
|---|---|---|
| RU | 2389089 C1 | 5/2010 |
| RU | 2015128047 A | 2/2017 |
| RU | 2646443 C2 | 3/2018 |

OTHER PUBLICATIONS

International Search Report and Written Opinion dated Jan. 30, 2020 issued in PCT/US19/38253.
International Preliminary Report on Patentability dated Dec. 30, 2020 issued in PCT/US2019/038253.
Notification on Violation of Requirement of Unity and Search Report dated Sep. 3, 2021 in Russian Patent Application 2020142062.
Decision to Grant dated Oct. 25, 2021 in Russian Patent Application 2020142062/07(078172) (with English translation).

* cited by examiner

```
MCMP COMMAND PROMT                                    — ☐ ✕

C:\USERS\CDGRAMLICH\DESKTOP\INVERTED_REACTOR> IR_MCNP_RUN .BAT
MCNP INPUT DECK TITLE: SPACE-REACTOR
MCNP RUN TITLE: SPACE-REACTOR

1 = WATER
2 = HYDROGEN
3 = CO2
4 = NA
5 = NAK
PASSAGEWAY MATERIAL: 2

1 = URANIUM METAL
FUEL MATERIAL: 1

1 = MOLYBDENUM
CLADDING MATERIAL: 1

1 = GRAPHITE
REFLECTOR MATERIAL: 1

GEOMETRY REVIEW? (Y/N) : Y
  MCNP   VER=6   , ID=05/08/13  04/10/18  16:21:55
         CODE NAME & VERSION = MCNP6, 1.0
         COPYRIGHT LANS/LANL/DOE - SEE OUTPUT FILE

_/    _/    _/_/      _/    _/_/      _/_/
            _/_/  _/_/  _/         _/_/  _/    _/ _/
           _/  _/  _/  _/         _/  _/ _/_/_/  _/_/_/_/
          _/      _/  _/         _/    _/ _/         _/
         _/      _/    _/_/_/   _/    _/ _/       _/_/

WARNING. PHYSICS MODELS DISABLED.
 282 P 0 1 0 0.10000
   WARNING. THIS SURFACE HAS BEEN REPLACED BY A SURFACE OF TYPE PY
 283 P 0 1 0 -0.10000
   WARNING. THIS SURFACE HAS BEEN REPLACED BY A SURFACE OF TYPE PY
 318 P 0 1 0 0.10000
   WARNING. THIS SURFACE HAS BEEN REPLACED BY A SURFACE OF TYPE PY
 319 P 0 1 0 -0.10000
   WARNING. THIS SURFACE HAS BEEN REPLACED BY A SURFACE OF TYPE PY
 378 P 0 1 0 0.10000
   WARNING. THIS SURFACE HAS BEEN REPLACED BY A SURFACE OF TYPE PY
 379 P 0 1 0 -0.10000
   WARNING. THIS SURFACE HAS BEEN REPLACED BY A SURFACE OF TYPE PY

COMMENT. TOTAL FISSION NUBAR DATA ARE BEING USED.
COMMENT.    54 SURFACES WERE DELETED FOR BEING THE SAME AS OTHERS.
WARNING. KCODE USUALLY NEEDS S(A, B) PHYSICS  (MT CARD)
COMMENT. USING RANDOM NUMBER GENERATOR  1, INITIAL SEED = 19073486328125
IMCN  IS DONE
```

FIG. 10A    500

UNIVERSAL INVERTED REACTOR

RELATED APPLICATIONS

This application is based on and claims priority under 35 U.S.C. § 119(e) to U.S. Provisional Patent Application No. 62/688,255, filed Jun. 21, 2018, the entire contents of which are incorporated herein by reference.

TECHNICAL FIELD AND INDUSTRIAL APPLICABILITY

The present disclosure relates generally to fission reactors and structures related to the active reactor space in fission reactors. In particular, the disclosed fission reactor and reactor space includes fissionable nuclear fuel loaded into the spaces between channels for coolant flow, and is scalable in size while each location with fissionable nuclear fuel remains identical in cross-sectional area and/or volume, regardless of reactor size. Support and ancillary equipment, such as control rods, control rod drivers, and moderators and also scalable in size. The present disclosure also relates to methods to manufacture such reactors and structures, particularly by additive manufacturing techniques producing an integral and unitary structure for the fuel loaded reactor space, and provides predictive quality assurance for the manufacture of such reactors and structures.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Traditional fission reactors utilize fissionable nuclear fuel, such as uranium-based fuel, placed inside fuel elements, which can be round tubes, plates, or hexagon-shaped. These fuel elements are collected and arranged into fuel assemblies, which are the base element of the core of a nuclear reactor. Conventional fuel assemblies 10 (see FIG. 1) are complex arrangements of, for example, fuel elements 12 (which contain the fuel 14 and burnable poisons), mechanical support for the fuel assembly structure, spacer grids 16 (which ensure a spacing of components and guiding of the fuel elements), and non-fuel tubes for, e.g., control rods 18 or in-core instrumentation 20 and the like. Depending on the design, a reactor vessel may have dozens of fuel assemblies 10 (also known as fuel bundles), each of which may contain 200 or more fuel elements 12.

Within the core, primary coolant (such as water) flows through and/or around the fuel assemblies 10 and provides both a moderator for the fission reaction (in the case of water-type cooled reactors) and a heat extraction medium for heat generated by fission reaction in the fuel elements. The heated primary coolant circulates within a primary cycle (meaning those systems subject to, in contact with or otherwise exposed to the primary coolant) and traditionally transfers thermal energy to a secondary system, where thermally excited fluid is generated and flows to turbines which, in turn, can be used to spin an electric generator.

Complexity of structure extends to other systems in a nuclear reactor, including the various components of the primary cycle, such as, depending on design, tubing, pumps, instrumentation, heat exchangers, and steam generators. Accordingly, construction of fuel elements, fuel assemblies, reactor cores, and reactor systems are all subject to rigorous design and manufacturing standards as well as extensive pre-, during, and post-manufacturing controls, such as those related to sourcing, handling, installing, inspecting and testing.

Thus, it would be advantageous to have a design of these complex structures, in particular the fuel element and fuel assembly, that improves any of the design and manufacture of such complex structures and quality assurance.

SUMMARY

In general, the disclosure is directed to a fission reactor that places fissionable nuclear fuel in locations in the reactor core between and around non-fuel tubes for primary coolant, moderator, control rods, scram rods and/or ancillary equipment. This placement of fissionable nuclear fuel and non-fuel tubes is opposite to (or inverted from) the conventional arrangement of fissionable fuel located in tubes and primary coolant flowing between and around the fuel tubes.

Embodiments disclosed herein include a fission reactor comprising a shell encompassing a reactor space having a longitudinal axis and an axial cylinder including an inner diameter surface defining a central longitudinal channel having an axis that is co-located with the longitudinal axis of the reactor space. A plurality of axially extending rings is located within the reactor space and concentrically positioned relative to the axial cylinder. The plurality of axially extending rings is radially separated forming, for any two adjacent axially extending rings, both a radially inward adjacent ring and a radially outward adjacent ring. An outer diameter surface of the radially inward adjacent ring and an inner diameter surface of the radially outward adjacent ring define an annular cylindrical space. The fission reactor includes a first plurality of primary axial tubes is located circumferential within each annular cylindrical space. Each primary axial tube includes an inner diameter surface forming a primary channel and an outer diameter surface. A plurality of webbings connects at least a portion of, alternatively all of, the plurality of primary axial tubes to adjacent structure, such as the outer diameter surface of each of the plurality of primary axial tubes connected to the radially inward adjacent ring by a first webbing and connected to the radially outward adjacent ring by a second webbing. The fission reactor includes a plurality of secondary channels within each annular cylindrical space, wherein circumferentially adjacent primary axial tubes are separated by one of the plurality of secondary channels. A fissionable nuclear fuel composition is located in at least some of the plurality of secondary channels.

Embodiments disclosed herein also include a method of manufacturing a fission reactor. Embodiments of the method apply predictive and causal analytics to prepare a model of the fission reactor, fabricate the fission reactor on a layer-by-layer basis using additive manufacturing techniques, during fabricating, in-situ monitor fabrication of the fission reactor with machine vision and accelerated data-processing, analyzes data from the in-situ monitoring, and adjusts the fabricating of the fission reactor based on the real-time analyzed data. In some instances, manufacturing equipment, particularly additive manufacturing equipment, have a limited manufacturing volume that impacts the maximum size of any single monolithically manufactured piece (although repositioning technology may accommodate increases in the size of such monolithic manufactured pieces). According, the fabrication methods disclosed herein for, e.g., the fission reactor (or other structures), can be adapted to manufacture structures on a monolithic basis or on a segmented basis for subsequent assembly.

Embodiments of the method can also prepare a digital version of the fabricated fission reactor; and correlate a characteristic of the fabricated fission reactor based on an analysis of the digital version of the fabricated fission reactor.

Further, embodiments disclosed herein can be used to qualify designs and validate acceptable fabrication of fission reactors as well as individual components of fission reactors. For example, methods of manufacturing fission reactors disclosed herein can also be used to determine and confirm the performance and integrity of the as-built structures. As such, the methods can serve as a new means to qualify a reactor with, or provide information for acceptance criteria by, third parties, for example, government regulatory agencies, government agencies and departments, commercial entities such as power companies, and the like.

Although the disclosed reactor and core have complex mechanical geometries, integral and iterative manufacturing, such as 3D printing, of elemental metal or metal alloys or ceramics (including using such materials in, e.g., particle, wire or powder form), enables the inverted reactor to be more easily manufactured. Other advantages include an improved power to weight ratio, a reduction of internal stresses, and expandability by, for example, adding additional dimensional units in the form of rings or ring spacing.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

FIGS. 10A and 10B show screenshots associated with aspects of the Universal Inverted Reactor Computational Platform ("UIRCP") used to investigate aspects of embodiments of a fission reactor.

DETAILED DESCRIPTION

Figure 1:
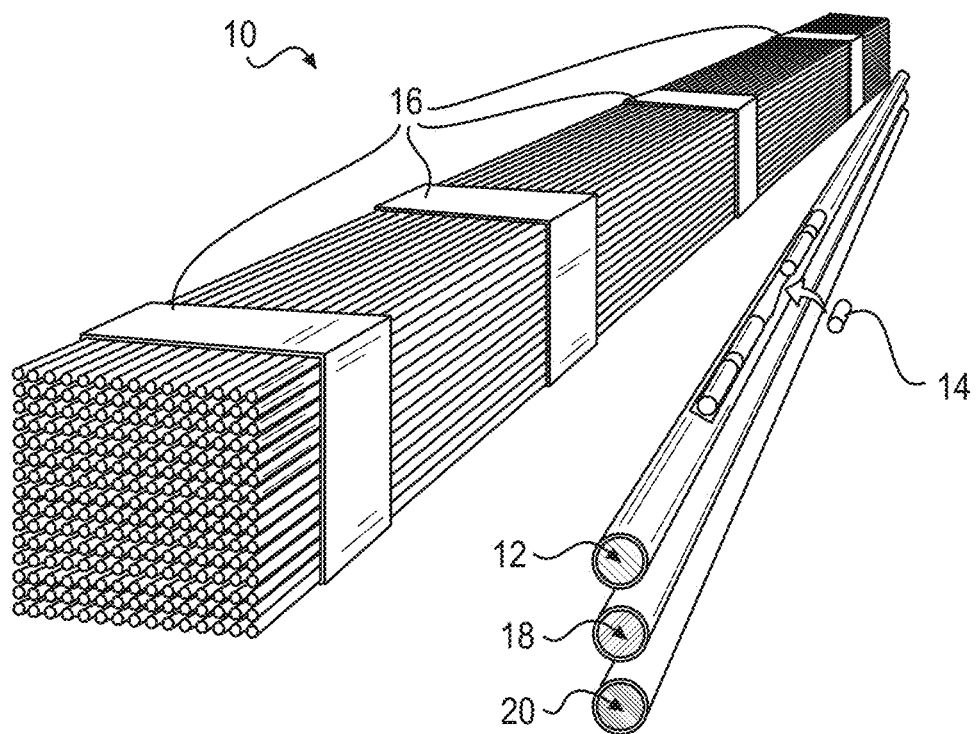
FIG. 1 shows a conventional fuel assembly with fuel elements comprising rods of fissionable nuclear fuel and non-fuel tubes and through and/or around which the primary coolant flows.
Figure 2A:
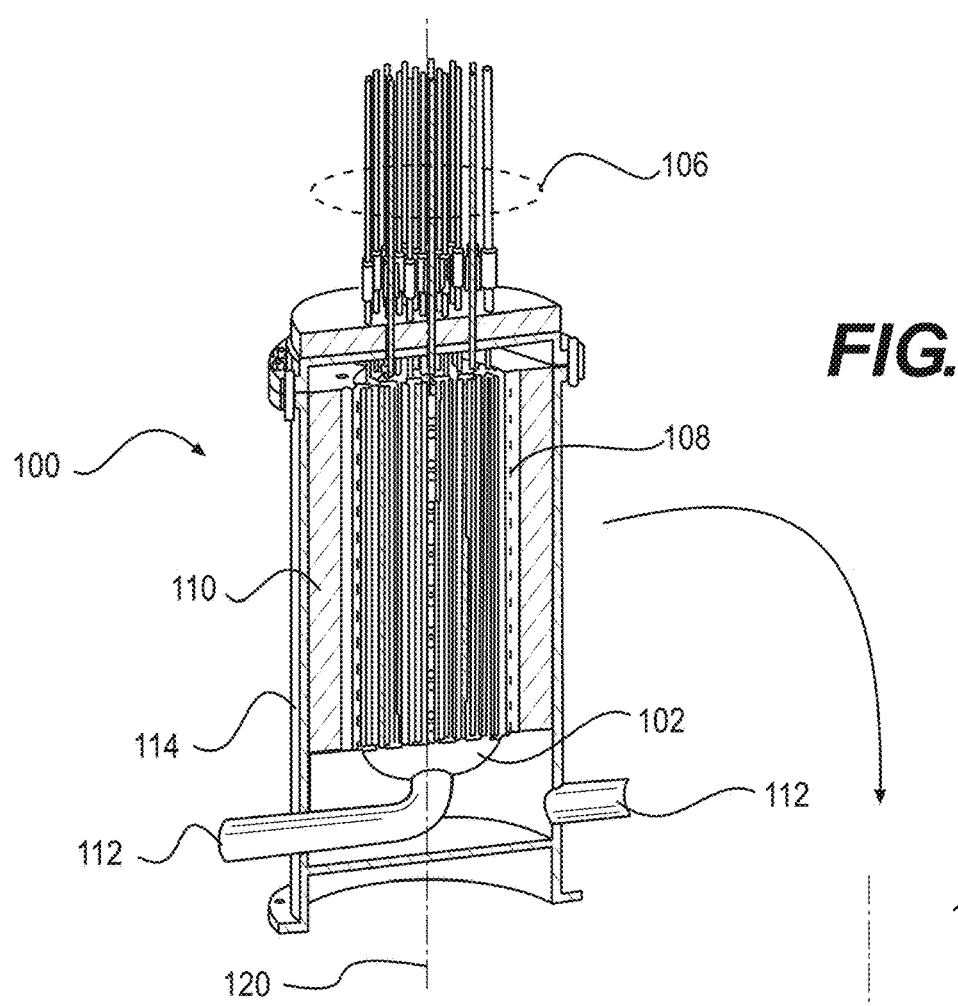
FIG. 2A shows a perspective, axial cross-sectional view of an example fission reactor
Figure 2B:
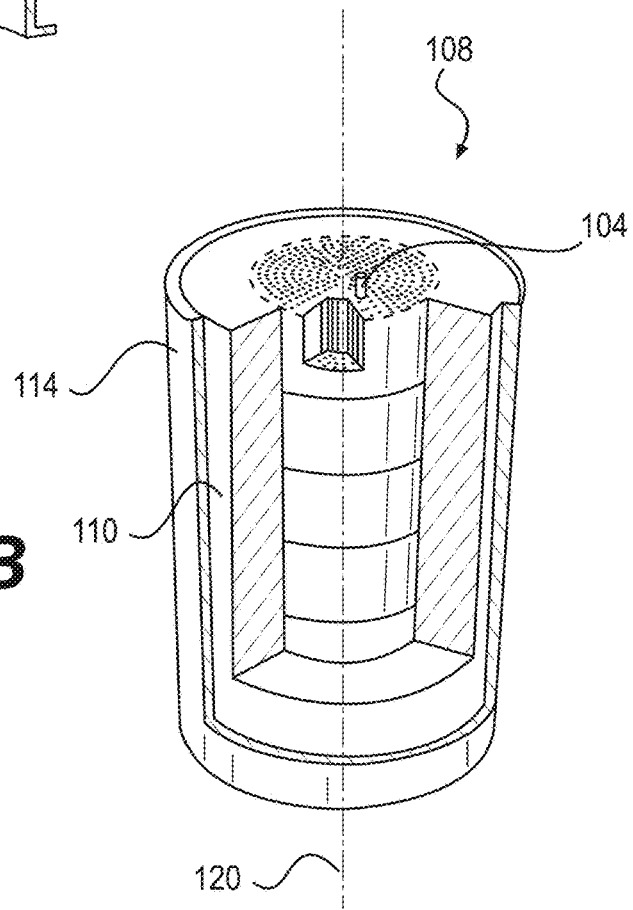
FIG. 2B shows a magnified, perspective, radial cross-sectional view of an example shell encompassing a reactor space.

FIG. 2A shows a perspective, axial cross-sectional view of an example fission reactor. The fission reactor 100 comprises a shell 102 that contains a fissionable nuclear fuel composition (an example of which is shown as fissionable nuclear fuel composition 104 in FIG. 2B), control rods and ancillary equipment 106 which movably penetrate the shell 102 and a reactor space 108, a reflector 110 around an outer diameter surface of the shell 102, tubes for primary coolant flow 112 to and from the shell 102, and a containment housing 114. FIG. 2B shows a magnified, perspective, radial cross-sectional and axial cut-away view of some of the features of FIG. 2A. For purposes of illustration and clarity, other features of fission reactors and of fission power plants are not shown in FIGS. 2A-B, such as other features of the primary system and secondary system, but are known to those of ordinary skill.

Figure 3A:
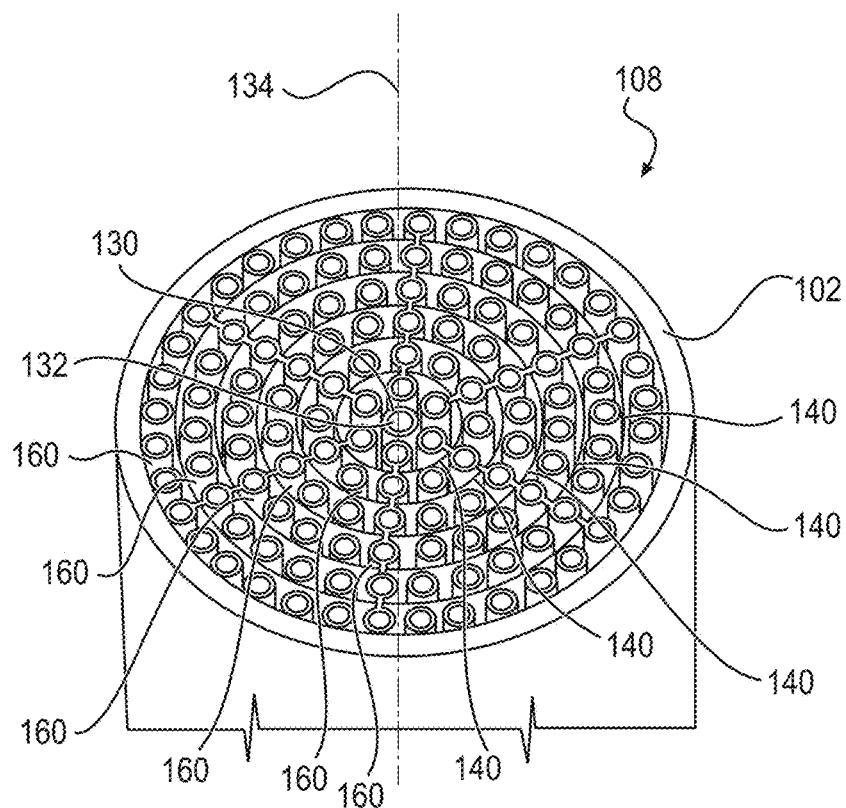
FIG. 3A shows a perspective, radial cross-sectional view of a portion of a fission reactor

FIG. 3A shows a perspective, radial cross-sectional view of a portion of a fission reactor 100. The illustrated shell 102 has a longitudinal axis 120 extending from a first end to a second end of the reactor space 108. Shell 102 encompasses a reactor space 108 that, in this embodiment, has internal features similar to a honeycomb structure, both radially and axially. For example, within shell 102 there is an axial cylinder 130 including an inner diameter surface 132 defining a central longitudinal channel having an axis 134 that is co-located with the longitudinal axis 120 of the reactor space 108.

Figure 3B:
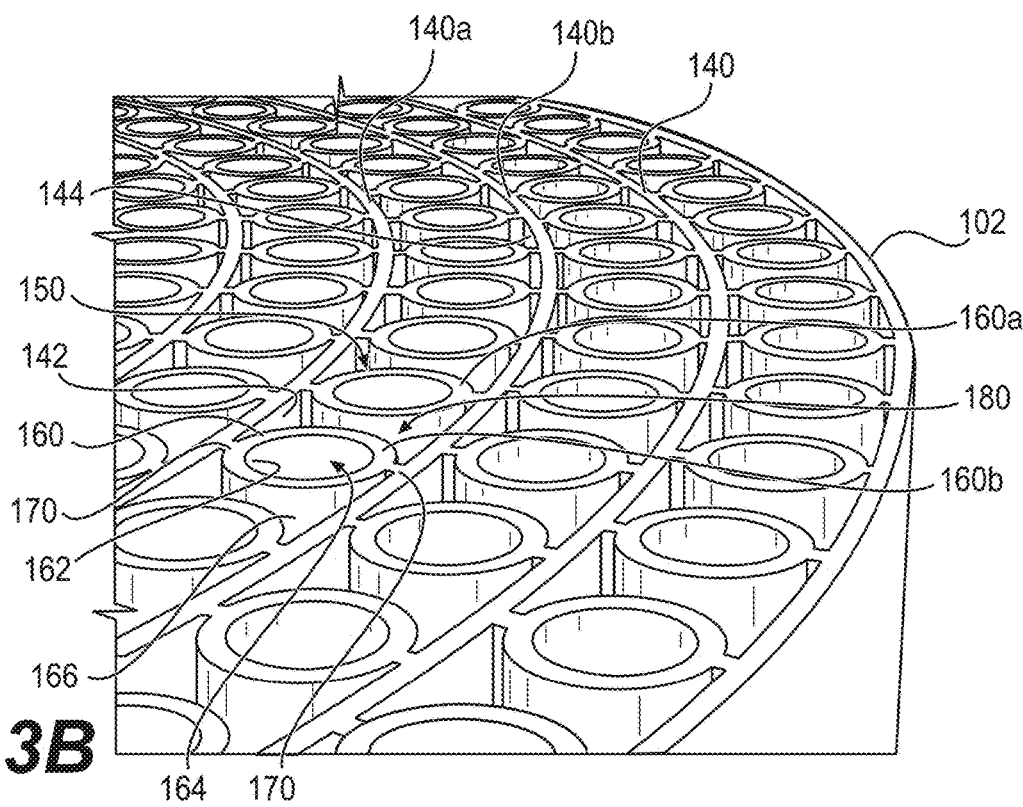
FIG. 3B shows a magnified, perspective, radial cross-sectional view of a portion of FIG. 3A.

Also located within the reactor space 108 are a plurality of axially extending rings 140 that are concentrically positioned relative to the axial cylinder 130. With reference to FIG. 3B, which shows a magnified, perspective, radial cross-sectional view of a portion of FIG. 3A, at least some of the plurality of axially extending rings 140 are radially separated and, when any two axially extending rings 140 are considered, form a radially inward adjacent ring 140a and a radially outward adjacent ring 140b. An outer diameter surface 142 of the radially inward adjacent ring 140a and an inner diameter surface 144 of the radially outward adjacent ring 140b define a cylindrical space 150.

Located circumferential within annular cylindrical space 150, there are a plurality of primary axial tubes 160. Each primary axial tube 160 includes an inner diameter surface 162 forming a primary channel 164 (primarily used for flow) and an outer diameter surface 166. A plurality of webbings 170 connect the outer diameter surface 166 of each of the plurality of primary axial tubes 160 to, in a first instance, the radially inward adjacent ring 140a and, in a second instance, the radially outward adjacent ring 140b. In some embodiments, the axial tubes 160 are connected by webbings 170 to at least one of, alternatively to both, the radially inward adjacent ring 140a and the radially outward adjacent ring 140b; in other embodiments, only some of the axial tubes 160 are connected by webbings 170 to at least one of, alternatively to both, the radially inward adjacent ring 140a and the radially outward adjacent ring 140b. The number, location and frequency of use of webbings 170 can vary based on the dimensional integrity to be provided to the overall design by making the connections using the webbings 170.

The inner diameter surface of the primary axial tubes (i.e., primary flow channel) can be uniform as a function of axial position or can vary. For example, in some embodiments, the inner diameter surface of the primary axial tubes forming the primary channel can vary as a function of axial position relative to the longitudinal axis of the primary axial tube, for example, to influence the flow properties of primary coolant. Also for example, in other embodiments, the primary channel is chambered to form different areas or zones along the axial length. These zones can be used to house instruments and/or other equipment or materials to monitor or influence reactor performance.

In some embodiments, one or more of the central longitudinal channel of the axial cylinder 130 and the primary channels 164 are accessible from an outer surface of the fission reactor. When accessible, the central longitudinal channel and/or the primary channel(s) can be used to prepare irradiated samples, such as irradiated medical equipment, medical isotopes, scientific isotopes, and so forth.

Also located within the reactor space 108 are a plurality of secondary channels 180. With reference to FIG. 3B, the plurality of secondary channels 180 are located within annular cylindrical space 150 and separate circumferentially adjacent primary axial tubes 160a, 160b. For example, inner surfaces of the secondary channel 180 include portions of the outer diameter surface 166 of the circumferentially adjacent primary axial tubes 160a, 160b, surfaces of a first webbing 170 and a second webbing 170 associated with each of the circumferentially adjacent primary axial tubes 160a, 160b, and portions of the outer diameter surface 142 of the radially inward adjacent ring 140a and portions of the inner diameter surface 144 of the radially outward adjacent ring 140b. Typically, circumferentially adjacent primary axial tubes 160a, 160b are non-contactingly distributed within the cylindrical space 150, forming a secondary channel 180.

Figure 4:
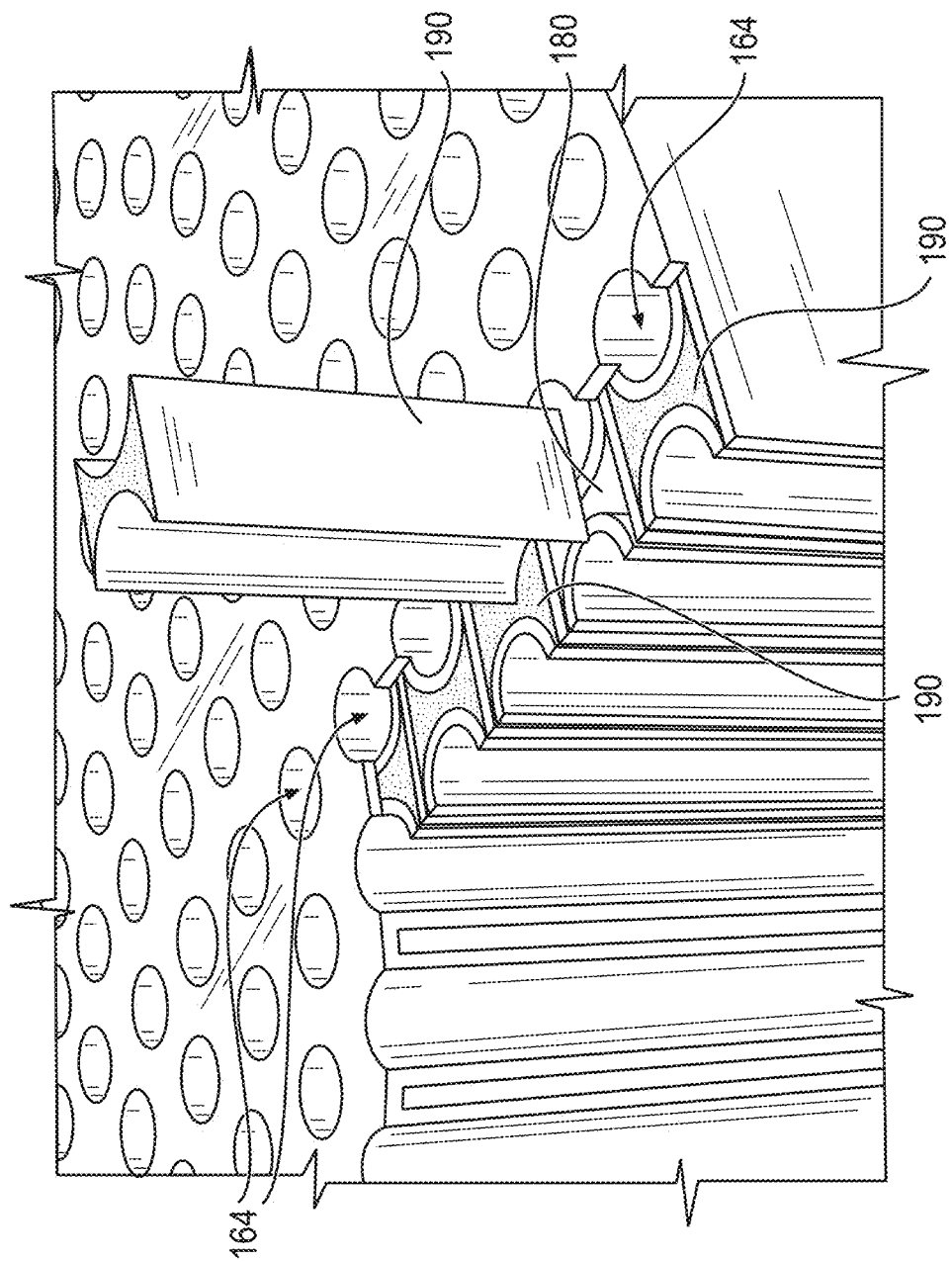
FIG. 4 shows a perspective, radial cross-sectional and axial cut-away view of a portion of a fission reactor and an example fuel element.

Also located within the reactor space 108 is a fissionable nuclear fuel composition 190. For example and as seen schematically in FIG. 4, the fissionable nuclear fuel composition 190 can be located in at least some of the plurality of secondary channels 180. The fissionable nuclear fuel composition 190 is in thermal transfer contact with at least some, if not all, of the inner surfaces of the secondary channel 180. During operation, a primary coolant is flowable through the primary channel 164 of each of the circumferentially adjacent primary axial tubes 160 that are separated by one of the plurality of secondary channels 180 which contain the fissionable nuclear fuel composition 190 to effect the thermal transfer. In the illustrated embodiment, a cross-section of the secondary channel perpendicular to the longitudinal axis has a shape of a cross-section of a hyperboloid of one sheet, however, other cross-sectional shapes can be used. A suitable fissionable nuclear fuel composition includes uranium oxide and is less than 20% enriched, uranium with 10 wt. % molybdenum (U-10Mo), uranium nitride (UN), and other stable fissionable fuel compounds, including metal-based fissionable fuels and ceramic-based fissionable fuels.

As is known in the art, during fission reaction of fissionable nuclear fuel, the breakdown of uranium produces many alternative elements in different phases (gas, liquid, or solids). Due to the design of the secondary channels 180 that contain the fissionable nuclear fuel composition 190 disclosed herein, the increase in internal pressure in the secondary channel 180 due to this transmutation of elements places the secondary channels 180, i.e., the fuel chambers, in compressive forces and improves resistance to failure. This phenomenon is also seen when thermal expansion occurs. In contrast, traditional nuclear reactor fuels with uranium located inside tubes usually made typically of zirconium, the transmutation of elements increases internal tube pressures placing hoop stress (a form of tensile hoop stress) on the tubing that can lead to structural failure, such as cracking. Also, materials subject to tensile stresses are susceptible to different types of corrosion mechanisms, such as stress corrosion cracking, as compared to materials subject to compressive stresses. Further, hydride-forming metals (such as zirconium) are subject to hydrogen embrittlement and can become brittle and fracture, which is exasperated when the relevant part is under tensile stress as compared to compressive stress.

It should be noted that in the illustrated embodiment in FIG. 3A, an innermost plurality of primary axial tubes is not separated from the axial cylinder 130 by an axially extending ring 140. Thus, the reactor 100 includes a plurality of primary axial tubes 160 located circumferential between an inner diameter surface of the most radially inward, axially extending ring 140 and an outer diameter surface of the axial cylinder 130. Similar to that described in connection with FIG. 3B, the outer diameter surface of each of these plurality of primary axial tubes is connected to the outer diameter surface of the axial cylinder 130 by a first webbing 170 and is connected to the most radially inward, axially extending ring 140 by a second webbing 170.

It should also be noted that in the illustrated embodiment in FIG. 3A, an outermost plurality of primary axial tubes is not separated from the shell 102 by an axially extending ring 140. Thus, the reactor 100 includes a plurality of primary axial tubes 160 located circumferential between an inner diameter surface of the shell 102 and an outer diameter surface of the most radially outward, axially extending ring 140. Similar to that described in connection with FIG. 3B, the outer diameter surface of each of these plurality of primary axial tubes is connected to the outer diameter surface of the most radially outward, axially extending ring 140 by a first webbing and is connected to the inner diameter surface of the shell 102 by a second webbing.

Figure 5A:
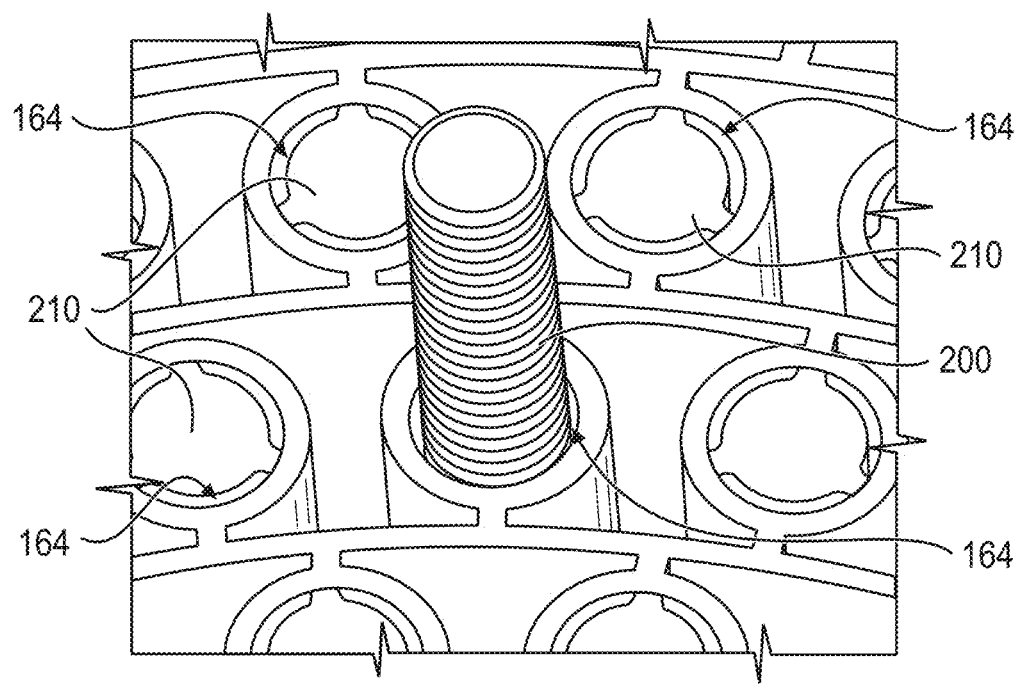
FIG. 5A is a schematic perspective view showing supporting and ancillary equipment located in a plurality of primary channels.

Various supporting and ancillary equipment can be located in one or more primary channels 164. For example, at least one of a moderator, a control rod, and a scientific instrument, such as a temperature sensor or radiation detector, can be located in one or more primary channels. FIG. 5A is a schematic illustration of a plurality of primary channels 164 in which supporting and ancillary equipment in the form of a control rod 200, such as iridium control rod, and a moderator 210, such as a zirconium hydride neutron moderator, are located. The control rod 200 can also incorporate a neutron poison which absorbs neutrons and can be used to regulate the criticality of nuclear reactors. Additionally, the poison material can absorb enough neutrons to shut down the fission reactor 100 (e.g., when the control rods 200 are completely inserted into the reactor space 108) or can be axially positioned to maintain criticality of the fission reactor 100 (e.g., when the control rods 200 are withdrawn from the reactor core 109 a distance to allow a continuous fission chain reaction). In some embodiments, the moderator 210 is cooled by flowing He and stabilized with a tri-fin design. Any suitable number of control rods 200 and moderators 210 can be used and suitably distributed throughout the reactor space 108 in order to obtain one or more of a desired flux profile, power distribution, and operating profile. In exemplary embodiments, control rods 200 are threaded, which contributes to save axial space, maximizes control rod diameter, and allows for direct roller nut contact for reliable SCRAM operation. All or a subset of control rods 200 can be individually controlled by independent motors to provide discrete reactivity control and/or for power shaping.

Figure 5B:
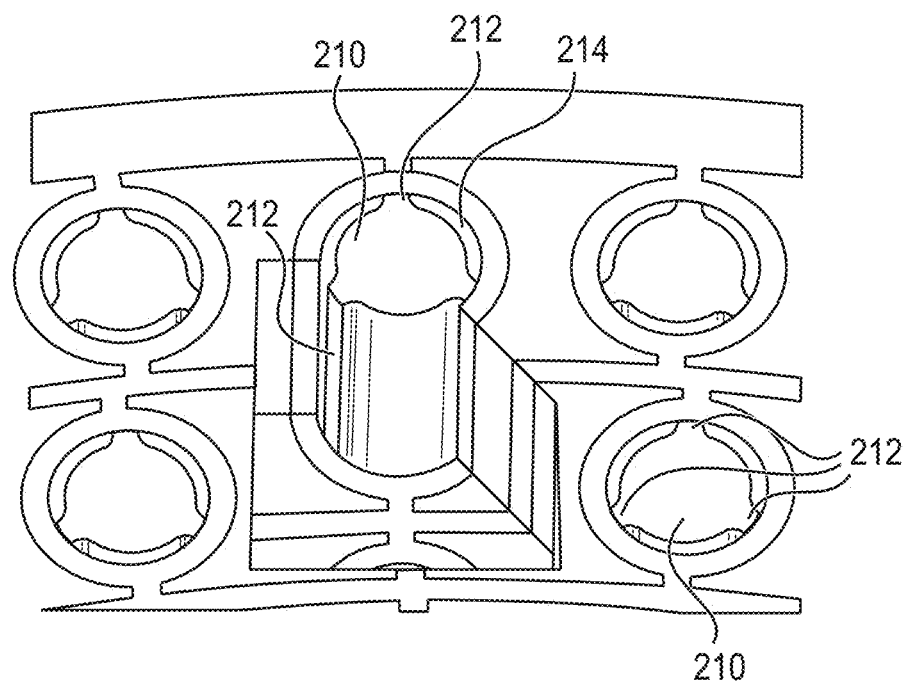
FIGS. 5B and 5C illustrate examples of neutron moderating material in the form of rods.

In some embodiments, an insert of neutron moderating material in the form of a rod with one or more axial protrusions can be located in the primary channel 164. FIGS. 5A and 5B illustrate an example of such a neutron moderating material in the form of a rod 210 in primary channel 164. The rod 210 includes one or more fins 212 or other protrusion(s) that contribute to maintaining a consistent gap 214 between the inner diameter surface of the primary channel 164 and the outer surface (or at least a majority of the outer surface) of the moderator rod 210. The fins/protrusions 212 can extend axially along the length of the rod 210. This design is particular relevant to gas-cooled reactors in which the gap 214 allows for sufficient flow for the gas to, for example, both generate thrust for a space reactor or drive a closed-loop power generating system, and cool the moderating material. The moderator material also acts to thermalize the neutrons, creating a more neurotically efficient core.

Individual moderator rods can advantageously be inserted into any number of desire locations in the core, can be independently replaced or serviced as needed, and allows for a larger diameter coolant hole during manufacture of the core.

Figure 5C:
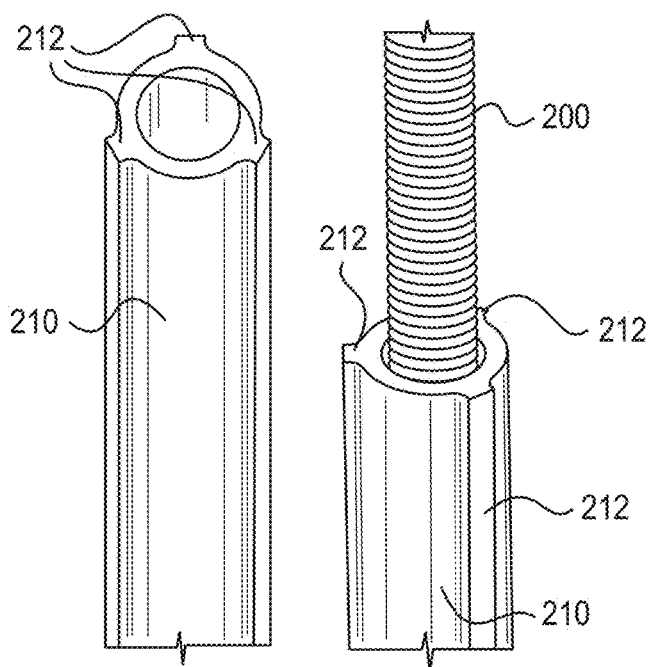

The moderator rod 210 may also take the form of an annulus to allow for additional cooling or accommodate the insertion of a control rod 200 or other material, such as is shown in the alternative embodiment of a moderator rod 210 illustrated in FIG. 5C. A cladding material may also be used for hydrided materials to limit or prevent migration of hydrogen, the key component for neutron moderation, from the metal. Cladding can also be used as a barrier between the moderator material and coolant gas.

Figure 5D:
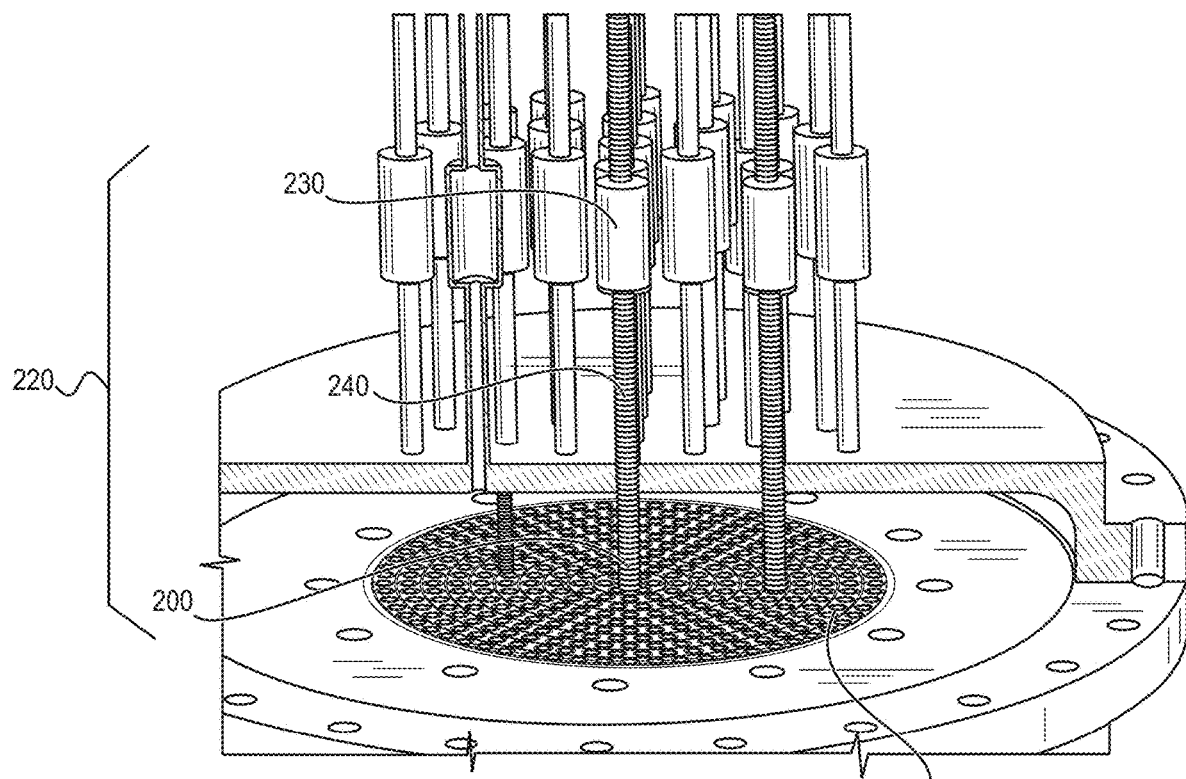
FIG. 5D is a schematic perspective view showing a control rod system and its position relative to a partial, cut away view of a fission reactor.

As noted in discussing FIG. 2A, the fission reactor 100 includes control rods which movably penetrate the shell 102 and the reactor space 108. The positioning and operation of the control rods, such as control rod 200, is controlled by a control rod system 220 (See FIG. 5D). An embodiment of a control rod system 220 includes three major items: a control rod drive motor 230 used to move the control rod 200 into and out of the reactor space 108; a threaded drive shaft 240 connected to the control rod 200 that drives the control rod 200 into and out of the reactor space 108; and the control rod 200, which is usually a cylindrical neutron absorbing poison that travels into and out of the primary channel 164. Driving the control rod 200 into and out of the reactor space 108 is usually performed by rotating a threaded nut located internally to the control rod drive motor and coupled to the threaded drive shaft such that rotation of the internally threaded nut causes translational movement, i.e., in the longitudinal direction, of the control rod 200.

In some applications, such as space reactors, the size and weight for the fission reactor and its components is limited to the weight/cost penalty incurred when such systems are launched into space. Thus, other embodiments of a control rod system seek to simplify their design since maintenance or replacement of reactor components cannot be performed once launched or once they have operated. Thus, it is beneficial to reduce the size, weight and complexity of the items in the control rod system. Although not necessarily size and weight limited, terrestrial reactors can benefit from similar improvements in design because of the reduction in maintenance and reduced part replacement. To address such design concerns, embodiments of the control rod system can combine the threaded drive shaft and the control rod poison by manufacturing the threaded drive shaft itself out of neutron absorbing material. When the threaded drive shaft is manufactured using neutron absorbing material, separate control rod poison can be reduced or eliminated from the fission reactor.

Control rod 200 in FIG. 5A shows an exemplary embodiment of such a threaded control rod that is manufactured from, or otherwise incorporates into its structure, neutron absorbing material. Suitable materials that can used in manufacturing the control rod (or otherwise incorporated in its structure) include: iridium, hafnium, stainless steel, tungsten, boron carbide in an aluminum oxide matrix ($Al_2O_3$—$B_4C$), molybdenum, and tantalum. While any one or more of various high temperature metallic neutron absorbing materials can be used, it is currently contemplated that iridium would be used as the neutron absorbing material.

Figure 6:
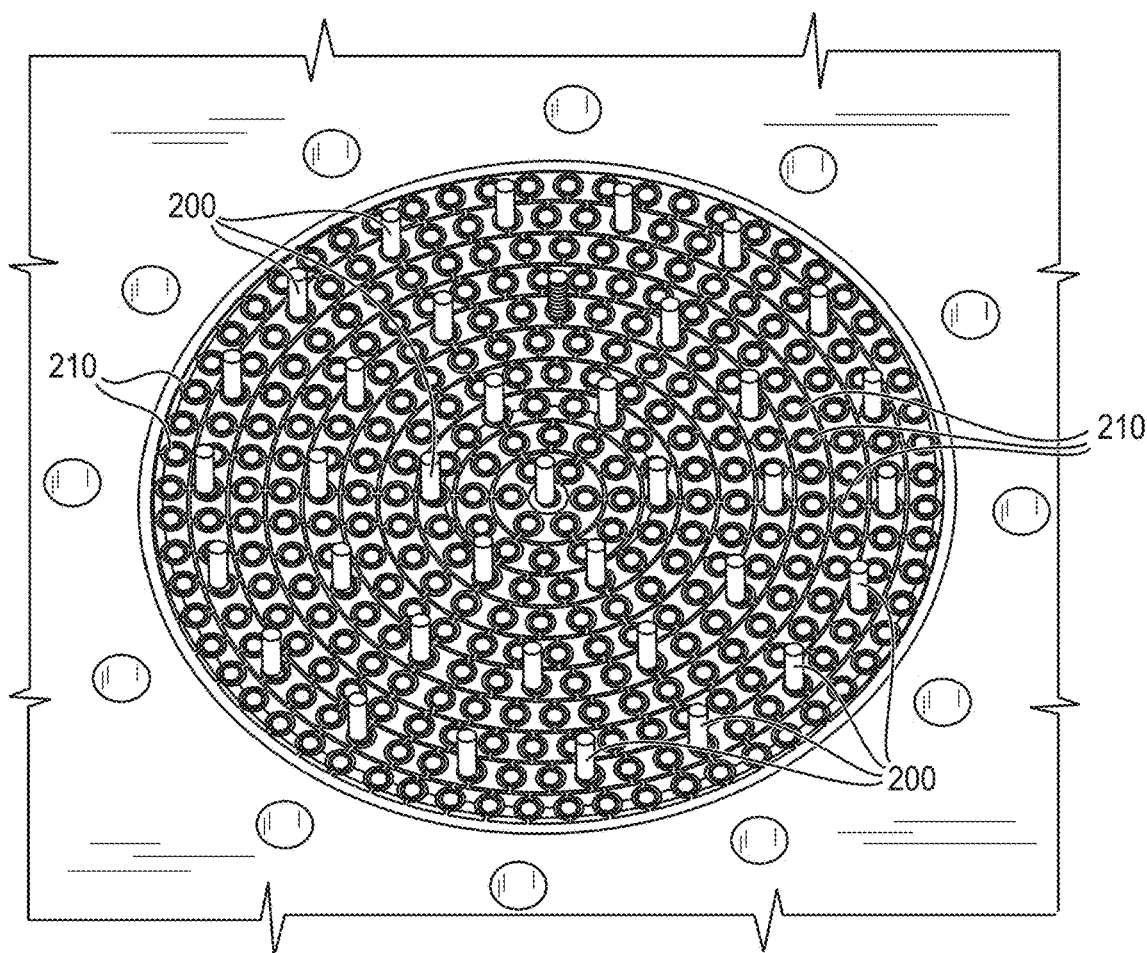
FIG. 6 illustrates in perspective cross-sectional view an example number and distribution of control rods and moderators in an exemplary embodiment of a fission reactor.

FIG. 6 illustrates in perspective cross-sectional view an example number and distribution of control rods 200 and moderators 210 in an exemplary embodiment of a fission reactor.

Figure 7:
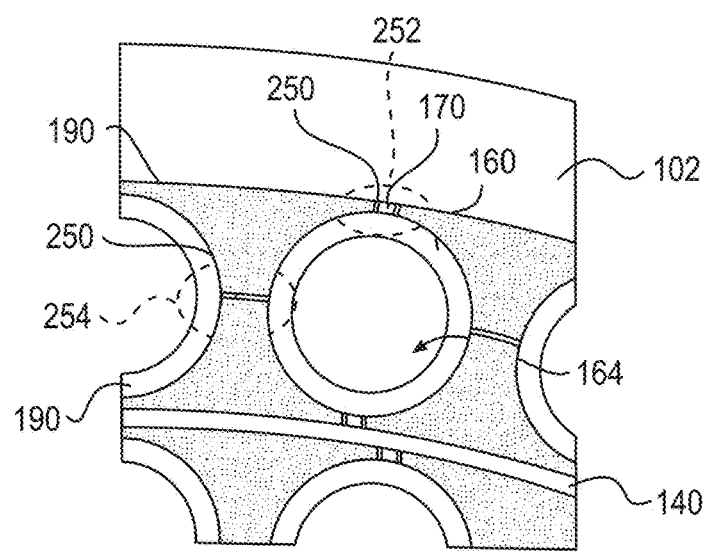
FIG. 7 is a schematic showing a portion of a radial cross-section of an exemplary embodiment of a fission reactor incorporating a space or gap to reduce stresses arising from transmutation of elements due to fission of fissionable nuclear fuel.

As discussed above, transmutation of elements increases internal pressures associated with the space occupied by the fissionable nuclear fuel. To reduce such internal pressures, embodiments of the fission reactor can design flexibility into components of the fission reactor to reduce the stresses that develop. For example, instead of a continuous volume of a fuel, embodiments of the disclosed fission reactor can incorporate a space, gap, hole or other opening between sections of the fissionable nuclear fuel composition within the secondary channels 180 or within the fissionable nuclear fuel composition 190 itself. One example of such a space or gap is illustrated in FIG. 7, in which one or more gaps 250 is incorporated into the fissionable nuclear fuel composition 190. Example locations for the gap(s) 250 include between the fissionable nuclear fuel composition 190 and the webbings 170 (see area 252) and in the body of the fissionable nuclear fuel composition 190 (see area 254). Modeling of stress in designs incorporating gaps showed a lower stress in the active reactor space 108 in areas having the gaps relative to areas which had no gap. Additionally, the overall hoop stress in the shell 102 was decreased. Further, the fissionable nuclear fuel composition 190 showed better interfacing with the surfaces and structures forming the secondary channel 180, resulting in better thermal transfer performance. For example, incorporating gaps 250 into the design has been shown to improve the contact with the outer diameter surface 166 of each of the plurality of primary axial tubes 160 (as compared to a design without such a gap 250), which contributes to improved thermal transfer between the fissionable nuclear fuel composition 190 and the primary coolant flowing through primary channel 164 formed by the inner diameter surface 162 of the primary axial tube 160.

In some embodiments, the fission rector 100 is a core of a gas-cooled nuclear reactor, in which thermal transfer occurs via gas flowing through holes in a reactor space 108, such as the primary channels 164 shown in FIGS. 3A-B, 4, and 5A, which are sized to allow efficient heat transfer from the solid reactor core. In embodiments of gas-cooled nuclear reactor, primary coolant removes heat from the reactor core, which in turn, heats the gas. The heated gas can then be used for thrust as in nuclear thermal rockets or used to drive a closed-loop power generating system. In order to generate the heat in the fissionable nuclear fuel that is transferred to the primary coolant, nuclear reactors rely on neutron moderating materials to thermalize, or slow, neutrons released in the fission process. Moderation of neutrons is required to sustain the nuclear chain reaction in the core and thus the production of heat. Water-cooled reactors rely on the water to both cool and moderate the neutron population; however, gas-cooled reactors require an additional material for moderation. The use of the additional moderating material to thermalize neutrons can allow reduction in the amount of fuel, and thus weight of the fission reactor, because thermalized neutrons more efficiently split fissile atoms.

In some embodiments, features of the fission reactor including at least the shell, the axial cylinder, the plurality of axially extending rings, the plurality of primary axial tubes, and the plurality of webbings are an integral, unitary structure. In other words, these features of the fission reactor are formed integrally by, for example, an additive manufacturing process. An example of a suitable additive manufacturing process utilizes 3-D printing of a metal alloy, such as a molybdenum-containing metal alloy, Zircalloy-4 or Hastelloy X, to form the noted structural features. In other embodiments, the fissionable nuclear fuel composition can be included within the integral, unitary structure when suitable multi-material, additive manufacturing processes with multiple metals within the feedstock are employed. Other alloys that can be used when suitable multi-material, additive manufacturing processes with multiple metals within the feedstock are employed include: steel alloys, zirconium alloys, and Molybdenum-Tungsten alloys (for the shell); beryllium alloys (for the reflector); and stainless steel (for the containment housing). Powder feedstock can also be utilized.

Figure 8:
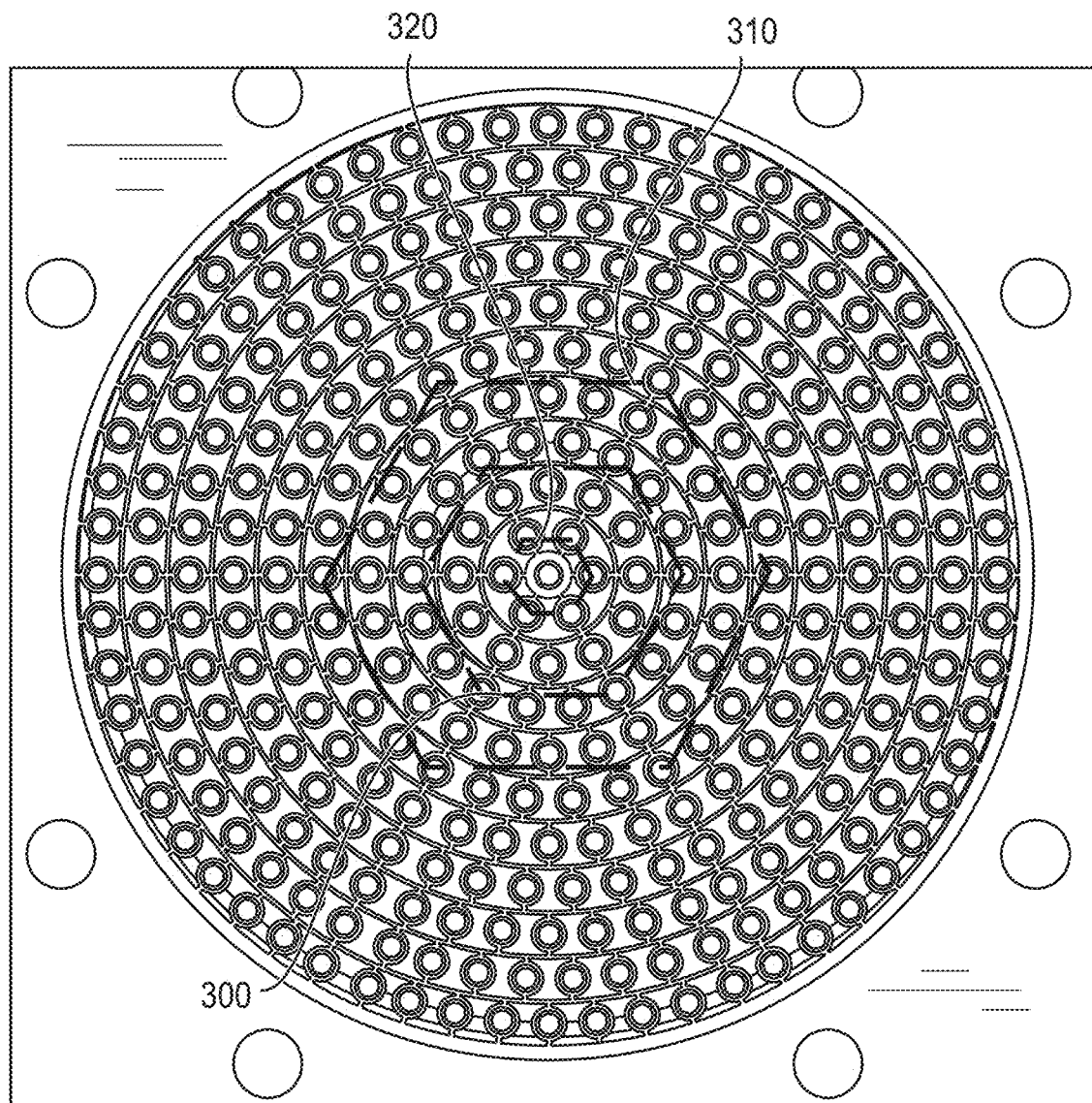
FIG. 8 illustrates the six-fold rotational symmetry of exemplary embodiments of the disclosed fission reactor.

The reactors shown and described herein have a six-fold rotational symmetry relative to the longitudinal axis of the reactor space. For example and with reference to FIG. 8, one can see that similar features within the reactor space 108 are arranged in a six-fold rotational symmetry relative to the longitudinal axis 120 of the reactor space. Examples of this six-fold rotational symmetry are shown in FIG. 8 superimposed on the radial cross-sectional view of an exemplary embodiment of a fission reactor. For example, a first six-fold rotational symmetry 300 is illustrated between control rods 200; a second six-fold rotational symmetry 310 is illustrated between moderators 210, and a third six-fold rotational symmetry 320 is illustrated between the plurality of primary axial tubes 160, in the corresponding cylindrical space 150 for such features.

It should be noted that the reactor space 108 (and, by extension, the reactor 100) is scalable by the addition or subtraction of one or more axially extending rings 140 and associated features disclosed herein such as primary axial tubes 160, as long as the underlying six-fold rotational symmetry relative to the longitudinal axis of the reactor space is maintained. For example, the radial configuration should geometrically progress as a factor of 6, e.g., 1, 6, 12, 18, 24, 30, 36 rods, etc. . . . . . This allows each secondary channel, which contains the fissionable nuclear fuel, to have the same volume regardless of position in the reactor space 108 and promotes uniform and optimal heat transfer between the fissionable nuclear fuel, the material of the reactor space, and the primary coolant. Thus, for example, the fissionable nuclear fuel composition located in at least some of the plurality of secondary channels form a set of fissionable nuclear fuel elements that are volumetrically identical throughout the fission reactor. Also for example, a ratio of an area of a radial cross-section of the primary channels to an area of a radial cross-section of the secondary channels is constant throughout the fission reactor (as considered between one or more primary channels and one or more secondary channels).

Additive manufacturing techniques, such as 3D printing techniques utilizing multiple feedstocks, can be used to produce the integral and unitary structure for the fission reactors and fuel loaded reactor spaces disclosed herein. For example, additive manufacturing technology creates complex geometries and, when coupled with in-situ sensors, machine vision imagery, and artificial intelligence, allows for tuning of the manufacturing quality as the components are built on a layer-by-layer additive basis (often, these layers are on the scale of 50 microns) and provides predictive quality assurance for the manufacture of such reactors and structures.

Figure 9:
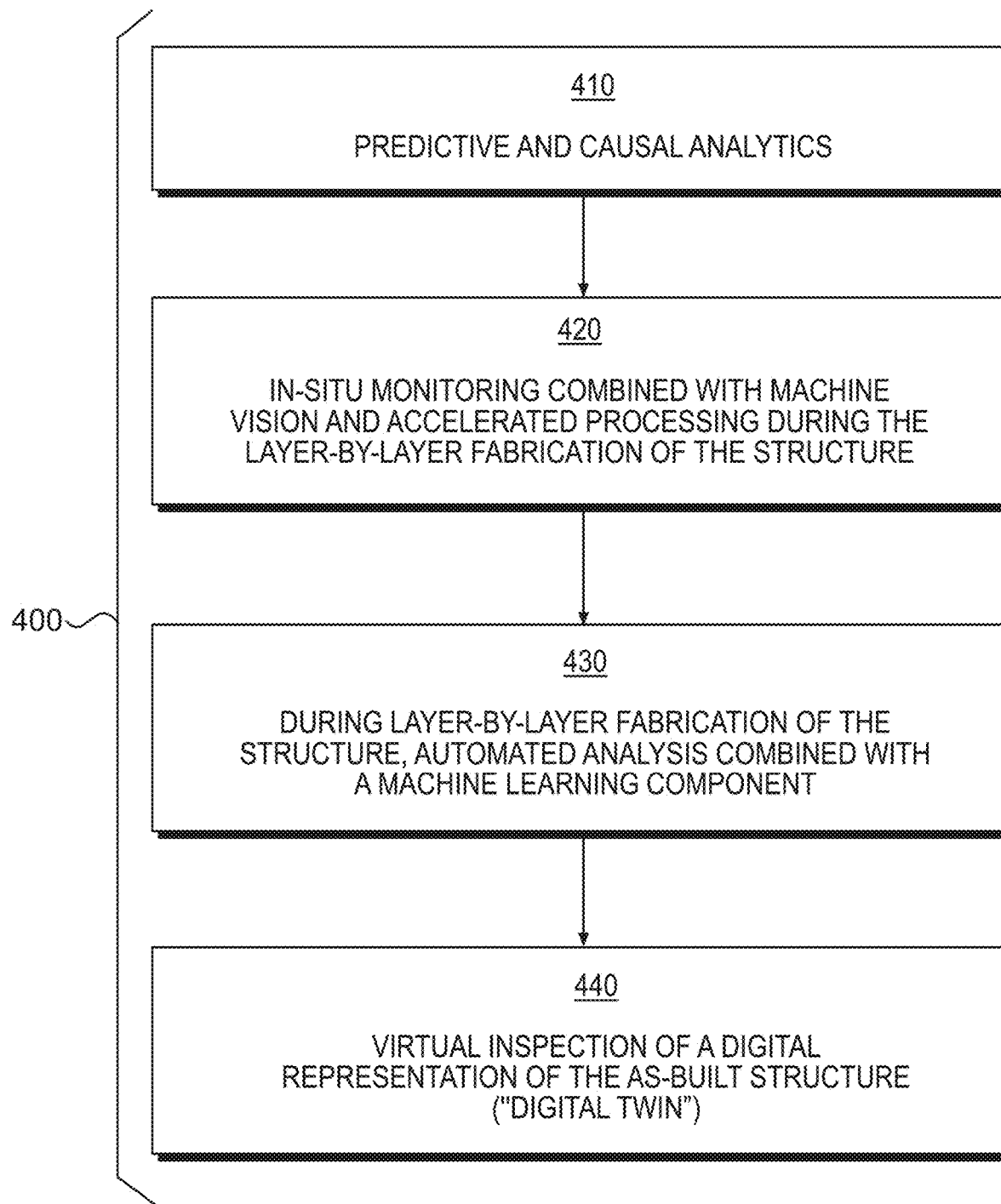
FIG. 9 summarizes an embodiment of an additive manufacturing method for manufacturing the integral and unitary structure for the fission reactors and fuel loaded reactor spaces disclosed herein.

Additive manufacturing techniques for the manufacture of the integral and unitary structure for the fission reactors and fuel loaded reactor spaces disclosed herein include the steps of: (a) predictive and causal analytics, (b) in-situ monitoring combined with machine vision and accelerated processing during the layer-by-layer fabrication of the structure, (c) automated analysis combined with a machine learning component, and (d) virtual inspection of a digital representation of the as-built structure (also referred to herein as a "digital twin"). FIG. 9 summarizes the additive manufacturing method 400 for manufacturing the integral and unitary structure for the fission reactors and fuel loaded reactor spaces disclosed herein.

The method 400 includes predictive and causal analytics 410 in which existing and experimental data is used to determine initial Critical-to-Quality (CTQ) factors and provide training of an initial machine learning algorithm. The initial input data for the machine learning algorithm can be one or more of developed organically, provided by a third party, or based on historical data sets (such as open source and/or based on operations and experiments that have captured prior experience with additive manufacturing techniques logged as potential features and observations relevant to the current additive manufacturing process). In each case, the initial machine learning algorithm is an algorithmic representation of each step in the manufacturing process as well as an algorithmic representation of the ideal, final structure. Additional complexity can be added to the initial machine learning algorithm by, for example, including additional variables for inputs, outputs, manufacturing conditions such as environmental conditions, quality of supplies, etc. . . . . While algorithms applied to the noted initial input data alone help describe final critical-to-quality (CTQ) factors on reactor products, they are not expected to be sufficient for qualification of the as manufactured product.

Data science methodology applicable to the step of predictive and causal analytics 410 including the following: (1) define defects; (2) translate to measured outputs (layer fusion, shape, position, etc.); (3) clean dataset with "tidy data" principles (variables in columns, observations in rows, linked tables, test reproducibility); (4) split data into training, test, and validation sets; (5) characterize data set, exploratory analysis, interrogate against physical theory; (6) extract candidate features; (7) state hypotheses of relationships to test from existing data; (8) build multivariate regression algorithms using resampling techniques for randomization; (9) assess in-and-out of sample errors; (10) evaluate hypotheses and establish foundational parameters for physical tests; (11) create known additive manufacturing geometries, validate predictive models, generate causal relationships and output parameters; and (12) re-evaluate hypotheses and update foundational defect definitions for machine learning basis. Successful initial machine learning algorithms determine foundational hypotheses about possible critical factors to the additive build with existing data prior to physical tests, and form the basis of machine learning. The final predictive model is then used to inform the in-situ measurement plan for physical production and initial machine learning conditions.

The step of predictive and causal analytics 410 typically occurs prior to the layer-by-layer deposition of material to fabricate the structure of the manufactured object.

The method 400 includes in-situ monitoring combined with machine vision and accelerated processing during the layer-by-layer fabrication of the structure 420. In this step, suitable in-situ monitoring captures data related to the layer-by-layer fabrication of the structure and accelerated processing digitizes the data for input into machine learning for analysis. In-situ monitoring can be by any suitable means. For example, industrial machine vision cameras can provide visual information including position information, thermocouples can provide temperature information of both supplied and as-deposited material, current and voltage sensors can provide information on deposition conditions, speed and rate of deposition can be monitored, environment conditions can be monitored, x-ray techniques can monitor material characteristics as well as provide materials characterization, infrared thermography for temperature distribution, and weld pool characteristics including structure and stress state are just examples of in-situ monitoring that can be conducted and the results then utilized in the additive manufacturing method. Other parameters that can be included in in-situ monitoring include cool-down profile, detection of voids, porosity measurement, defect detection such as for cracks, lamination, and dimensional irregularity. It should be noted that additive manufacturing methods pose sensor challenges as, for example, cameras and other sensors must be placed to collect data between the film layer and deposition head to detect structural placement and alignment. Parallel processing, such as GPU acceleration, may be advantageous—if not necessary—to handle the large amounts of data from in-situ monitoring and process dozens of desired features to return real-time corrections. Outputs of accelerated processing are fed back into machine control in a loop for self-correction or identification for off-line analysis with an as-built model.

The repetition of the in-situ monitoring and automated analysis step on a layer-by-layer basis as the integral and unitary structure for the fission reactors and fuel loaded reactor spaces disclosed herein are manufactured allows for continuous feedback to the manufacturing process. That feedback is then a basis for (i) layer-by-layer adjustments in the additive manufacturing process, (ii) archiving of monitored and analyzed information in the digital twin, allowing for subsequent analysis and evaluation, and (iii) updating and adjustment of the manufacturing protocols and layer-by-layer instructions for use in a future additive manufacture of the integral and unitary structure for the fission reactors and fuel loaded reactor spaces disclosed herein.

During layer-by-layer fabrication the structure of the manufactured object, the method 400 includes automated analysis combined with a machine learning component 430. Machine learning creates intelligence from input of machine vision and in-situ monitoring, applies that input to previously existing data, and updates the processing via machine training as well as self-adjusts and runs predictive qualification analysis during the additive manufacturing process.

Machine learning can include anomaly detection algorithms to monitor process function. For example, anomaly detection algorithms can check for variations in deposition speed, unexpected latency or volume consumption, temperature, alignment or chemistry. An automatic analysis of this process data can choose one or more features $X_1$ that indicate an anomaly, fit parameters $U_1$ to characterize the distributions of each chosen feature, and compute the probability that an observed X fits within acceptable Gaussian error for each feature U.

Machine learning can also include classifiers of imagery for in-process anomaly detection. For example, pixelated imagery can be used as input data, in which each sample is a small pixel area of an image. The number of areas that fit in an image represents the number of dimensions that can be used to differentiate and classify anomalies or shapes. The vectorized image of hundreds of dimensions (parts of images) permit the machine to learn what a proper shape or anomaly looks like via an optimization function on each feature. Once the classifier is trained to detect an anomaly, it can be further trained to identify prior detected deposition conditions that lead to an anomaly (within a certain statistical confidence level) and then apply that information to in-situ conditions to anomalies before they actually happen and proactively intervene in the additive manufacturing process to avoid the anomaly. This iterative corrective ability is important to make in-process adjustments before depositing numerous layers with defects.

Neural networks can be utilized for non-linear hypotheses related to machine learning. For example, neural networks use an array of features that take input conditions and fit models to correctly predict output conditions using a hidden layer to develop weighting parameters. Forward propagation algorithms provide predictive capability, and backward propagation is used to uncover the weighting scheme learned by the system. The hidden layer makes it possible to arrive at workable solutions when the number of features is large (like the imagery data) or interactions are complex, or both.

The method 400 also includes virtual inspection of a digital representation of the as-built structure (also referred to herein as a "digital twin") 440. Typically, the step of virtual inspection of the digital twin 440 occurs after completion of the layer-by-layer deposition of material to fabricate the structure of the manufactured object. The digital twin can be analyzed using various computer assisted structural analysis and modeling techniques, such as finite element analysis, to investigate structural analysis, heat transfer, fluid flow, and mass transport properties. Additionally, internal and hard to access features in the as-built structure can be readily accessed, viewed and analyzed in the digital twin. This provides a full 360 degree inspection as well as an "inside-out" verification capability. Because the digital twin replicates the actual, as-built structure, the results of such analysis on the digital twin is highly correlated to the actual, as-built structure. As such, one can statistically assess confidence in as-built product (for a desired parameter such as strength) based on the testing results on the digital twin.

In contrast to the myriad pre-, during, and post-manufacturing quality assurance methods of conventional manufacturing, which are often destructive-based techniques and/or inspection-limited, establishing the quality assessment during the manufacture of the integral and unitary structure for the fission reactors and fuel loaded reactor spaces disclosed herein not only offsets the difficulty of post-build validation of a complex product, but also renders it unnecessary with the more direct assurance provided by an inside-out assessment inspecting with high resolution layer-by-layer (at a minimum) resolution, regressed against a continuous input of process monitoring data along each additively manufactured layer.

Further, a virtual inspection can be accomplished with a model constructed out of as-built data processed analytically as it is collected during manufacture (e.g., the "digital twin" to the physical as-built product). Combined with the predictive power of a machine that learns of anomalies of consequence to quality (using stored and in-process data) and the ability to monitor, interpret and report the status (compared to the continuously updated baseline) of the final as-built product, the additive manufacturing methods disclosed herein avoid defects prior to occurrence as well as statistically assesses confidence in as-built product viability on a global basis across the whole as-built product based on the as-manufactured condition as monitored and recorded during the manufacturing process.

Example 1

A fission reactor having dimensions of 16-inch diameter and 24-inch height was modeled. The reactor had 6 cylindrical spaces and its axial height was divided into 20 equally spaced axial levels resulting in 2520 individual primary channels and 2520 individual secondary channels for potential fuel loading. FIG. 3A illustrates the arrangement of features on an axial level from a top perspective view. Example dimensions for structural considerations included: (a) outside perimeter of shell 102 of 0.75 inches, (b) thickness of walls of primary channels of 3 mm, and (c) thickness of axially extending rings and the webbings of 2 mm, but smaller dimensions can be used, which will provide the potential for additional fuel loading, or larger dimensions can be used, which provides strength. Following are the volumes for the shell metal, primary channels, and secondary channels (Uranium metal):

| | |
|---|---|
| Shell metal volume | 2258.9 in$^3$ (46.8% of core volume) |
| Primary channel volume | 1202.2 in$^3$ (24.9% of core volume) |
| Secondary channel volume (fuel volume) | 1364.3 in$^3$ (28.3% of core volume) |

The Uranium capacity for Example 1 was calculated. In the above 16"×24" configuration with a combined secondary channel volume (fuel volume) of 1364.3 in$^3$, a maximum U235 weight of 187 pounds would be possible if all secondary channels were filled with U235 at 20% enrichment. However, a plenum in each chamber allowing for an off-gas volume of 10% was incorporated. This resulted in a maximum U235 weight of 149.6 pounds at 20% enrichment. While this is much more than needed for criticality, this excess capacity enables tuning enrichments radially and axially for optimal fuel cycle efficiency and cycle length.

The size of the primary channels was arbitrarily chosen to be 18 mm in diameter with a 3 mm wall to provide a balance between strength and flow area. As a result, 127 holes were created with a combined flow area of over 50 int. The number of holes and size of the flow area allows for a vast number of possible flow channels, moderator rods, control rod locations, scram rod locations, and instrumentation needs. Desired power levels, fluid choices, moderator materials, control rod material and enrichments will drive specific purpose for each hole.

As seen in the drawings, every secondary channel with fissionable nuclear fuel, e.g., uranium, is connected to two halves of two different primary channels. Therefore, as long as every other primary channel is dedicated for fluid flow, each secondary channel with fuel will transfer heat into an adjacent primary channel for heat transfer purpose. Furthermore, 60 primary channel locations can be dedicated for non-flow needs (moderator, control, scram, and instrumentation). Considerations of plug design can also enable heat transfer in non-flow locations by not using the entire 18 mm primary channel size. For example, control rod designs with a finned shape could provide reactivity control and adequate flow simultaneously in a primary channel.

The example reactor has radial and axial enrichment advantages. Because each secondary channel with fissionable nuclear fuel is independent to every other secondary channel with fissionable nuclear fuel, custom enrichments can be chosen in both the radial and axial direction. Experience has shown this can improve fuel cycle efficiency by as much as 20% and balance shell temperatures. It is also conceivable to provide an infinite number of Uranium enrichments via additive manufacturing. For example by using a combination of only depleted Uranium wire and 20% enriched Uranium wire, any enrichment between these two extremes are possible (in contrast, in traditional practices, nuclear manufacturing companies typically limit themselves to less than 10 different enrichments due to, e.g., the complexity of non-additive manufacturing).

The example reactor is expandable and scalable. Although modeled with dimensions for a 16" by 24" reactor, any reactor size greater than 12" by 18" is possible. In addition, if the chamber radial width is kept to the details within this design and following the six-fold radial symmetry concept discussed above, any number of additional axially extending rings 140 can be added. The result will be a continuing highly symmetric configuration with all secondary channels with fissionable nuclear fuel identical in size, regardless of reactor size.

Example 2

A computational platform (referred to herein as the Universal Inverted Reactor Computational Platform or "UIRCP") consisting of ANSYS engineering simulation and 3D design software, SolidWorks solid modeling computer-aided design and computer-aided engineering computer program, and Monte Carlo N-Particle Transport Code ("MCNP") nuclear processes simulation program were utilized and applied to solve for the ideal thermal configuration of a universal inverted reactor design. Because fuel and cladding abut each other in the universal inverted reactor design disclosed herein (see, e.g., FIG. 4 and related description herein), there is a high potential for increased thermal stresses due to varying thermal expansion rates for the two materials that share the noted interface. The UIRCP was applied to address this issue and the fuel enrichment and reactor geometry was iterated to homogenize the radial thermal gradient. It should be noted that the axial thermal gradient and overall peak temperature are unavoidable due to the nature of a linear heat exchange and was not part of the UIRCP process.

Figure 10B:
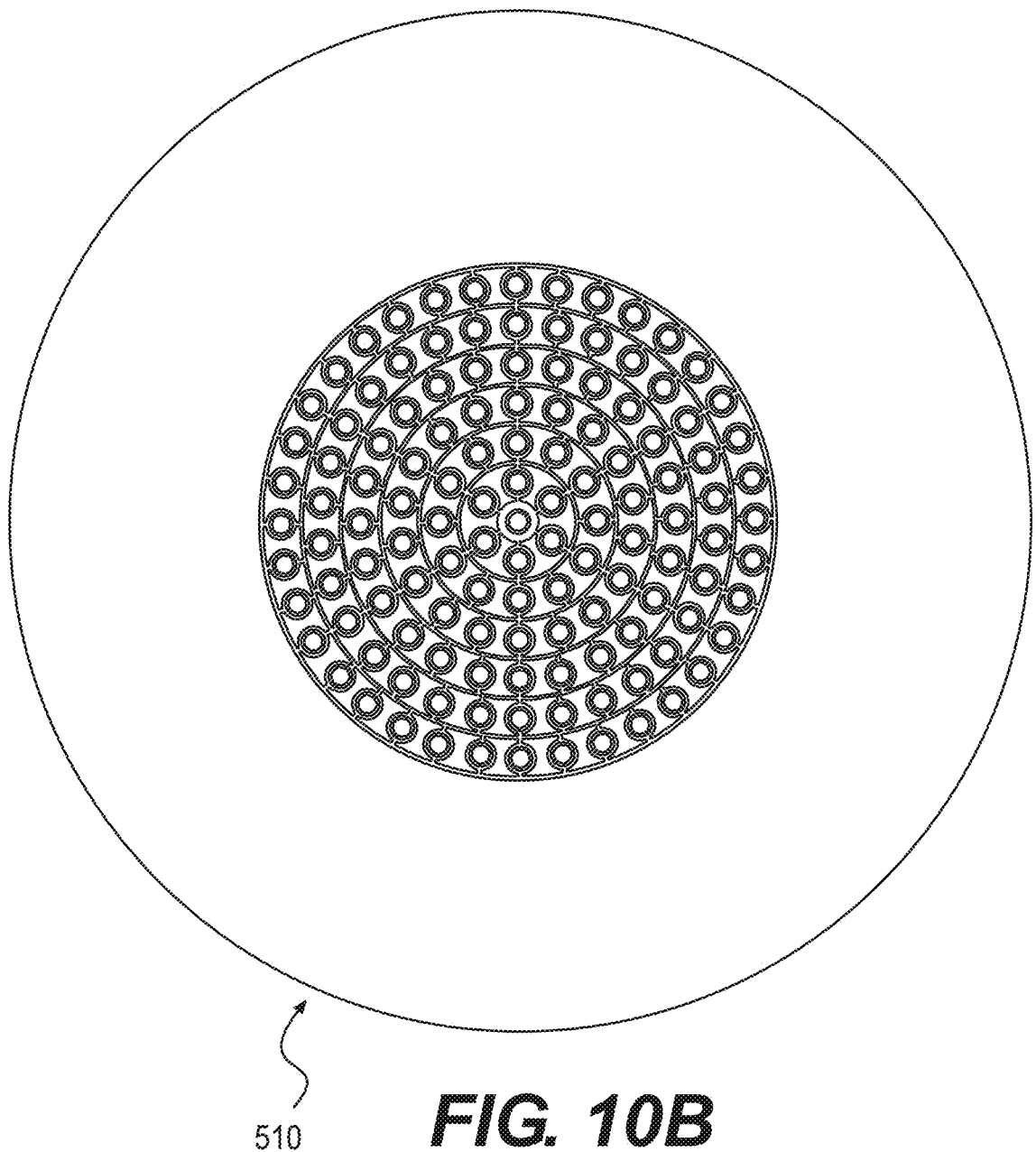

MCNP was applied in the UIRCP process to the modeled universal inverted reactor design to calculate the MeV/gram of each contiguous fuel element and check criticality. First, an input deck must be made based on the user's geometric and material inputs. Other user inputs can include material for coolant, fuel, clad, and reflector. This is done by reading the user inputs, outputting the geometry in MCNP format (binary geometry), labelling each cell with the desired material, and setting up the neutronic physics. The input deck is then run and the user given the option to review the geometry at this point by utilizing the visualization software functionality of the MCNP. The MCNP output is searched to find the MeV/gram associated with each fuel element, converted to $W/m^3$, and saved in a separate file. All these steps are controlled by a governing batch file that calls the necessary commands and sub-programs. FIG. 10A shows a screenshot 500 of the initial user interface and FIG. 10B shows a screenshot 510 of the MCNPX geometry review.

Figure 11A:
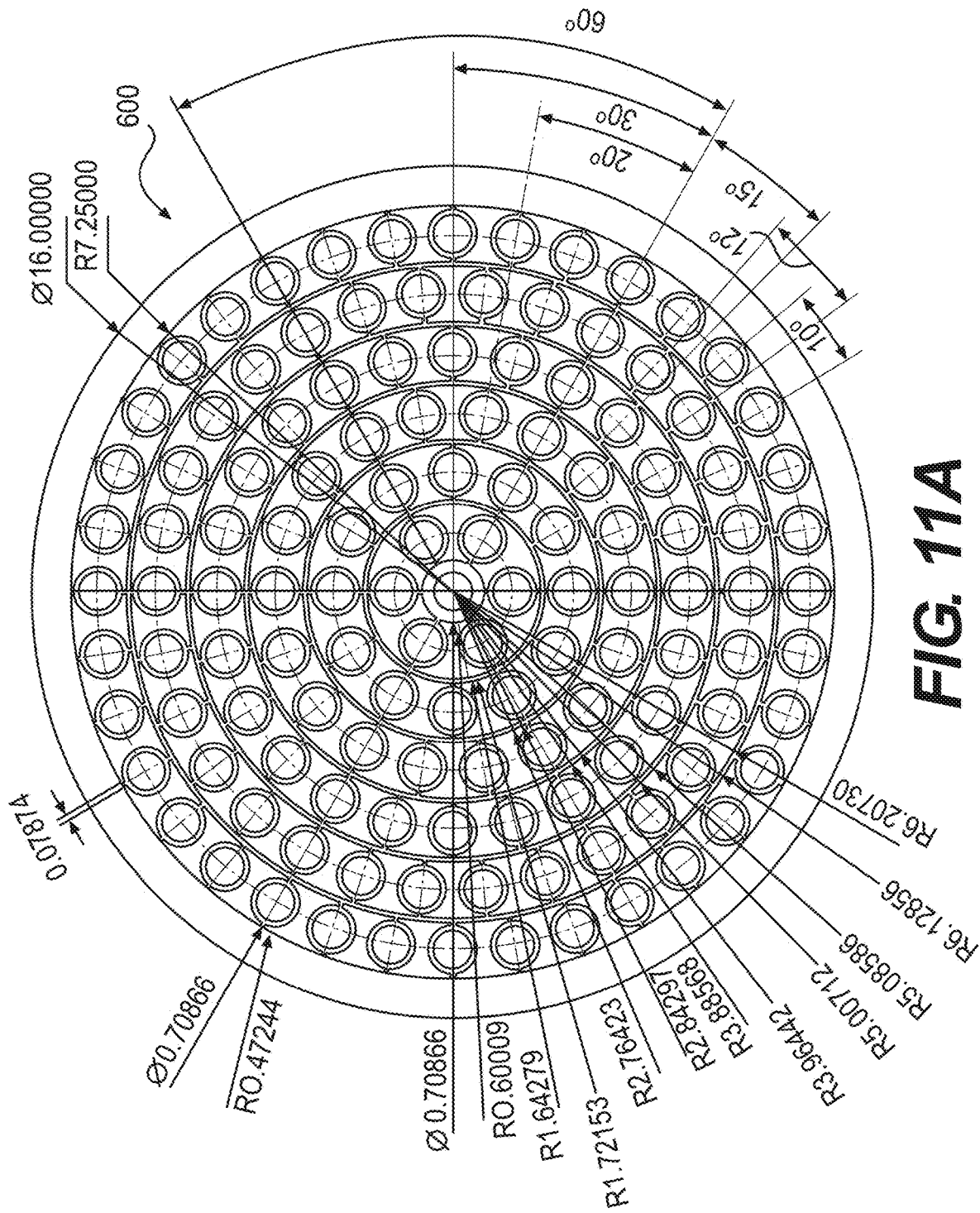
FIGS. 11A and 11B show details of the geometric structure and dimensions for geometric-related variables used in Example 2.
Figure 11B:
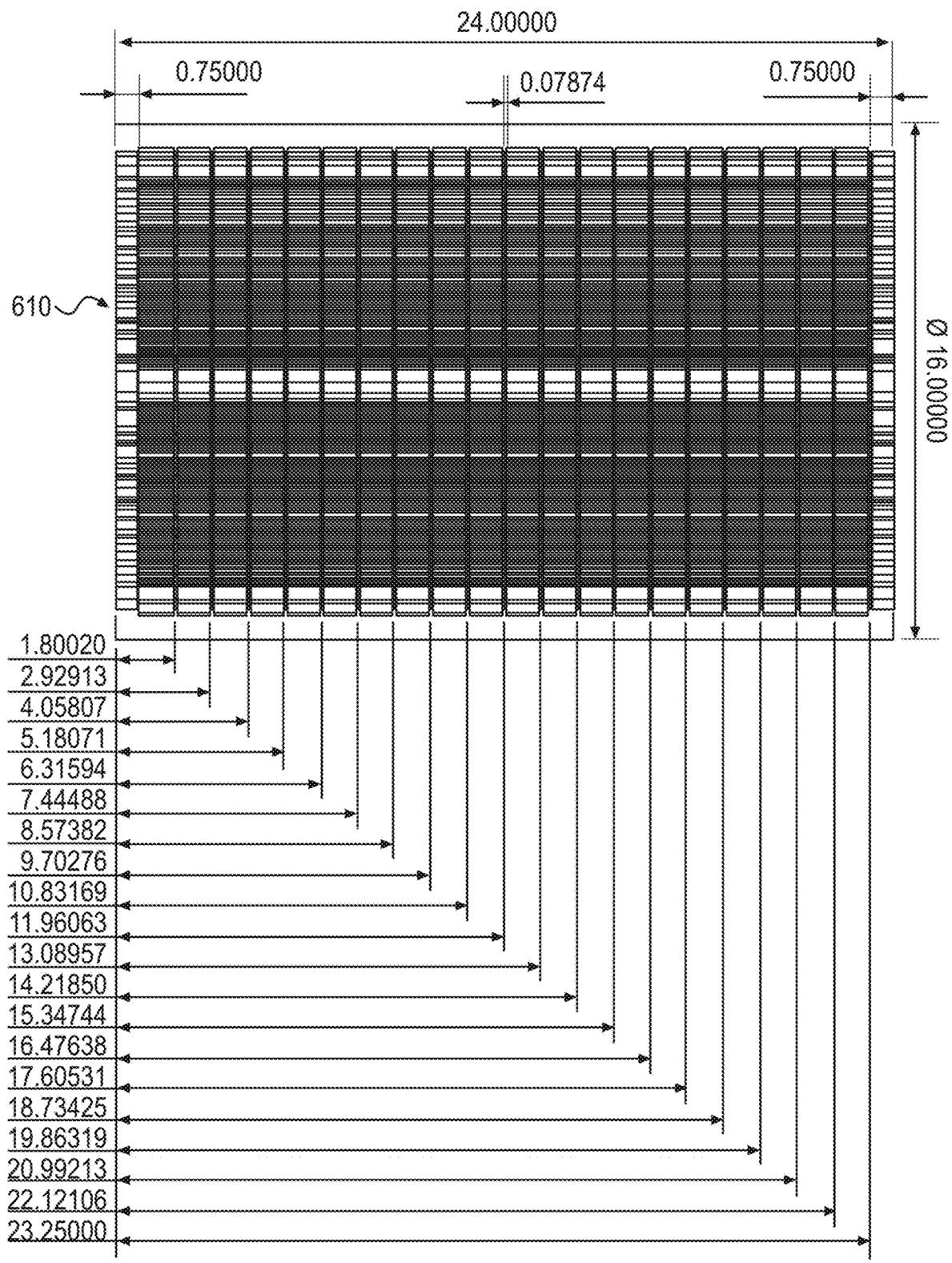

SolidWorks was applied in the UIRCP process to update the computer aided design (CAD) solid model of the reference reactor geometry based on user inputs. The user inputs were base geometry selection. The variables that were updated by the user were geometry variables: ring spacing, number of rings, clad thickness, passageway ID and OD, number of axial segments, and overall height. FIGS. 11A and 11B show diagrams 600, 610 with geometric structure and dimensions for geometric-related variables used in this example. Note the similarity between geometric structure in FIGS. 11A-B and the design of the reactor space 108 in FIG. FIGS. 3A-B.

Figure 12:
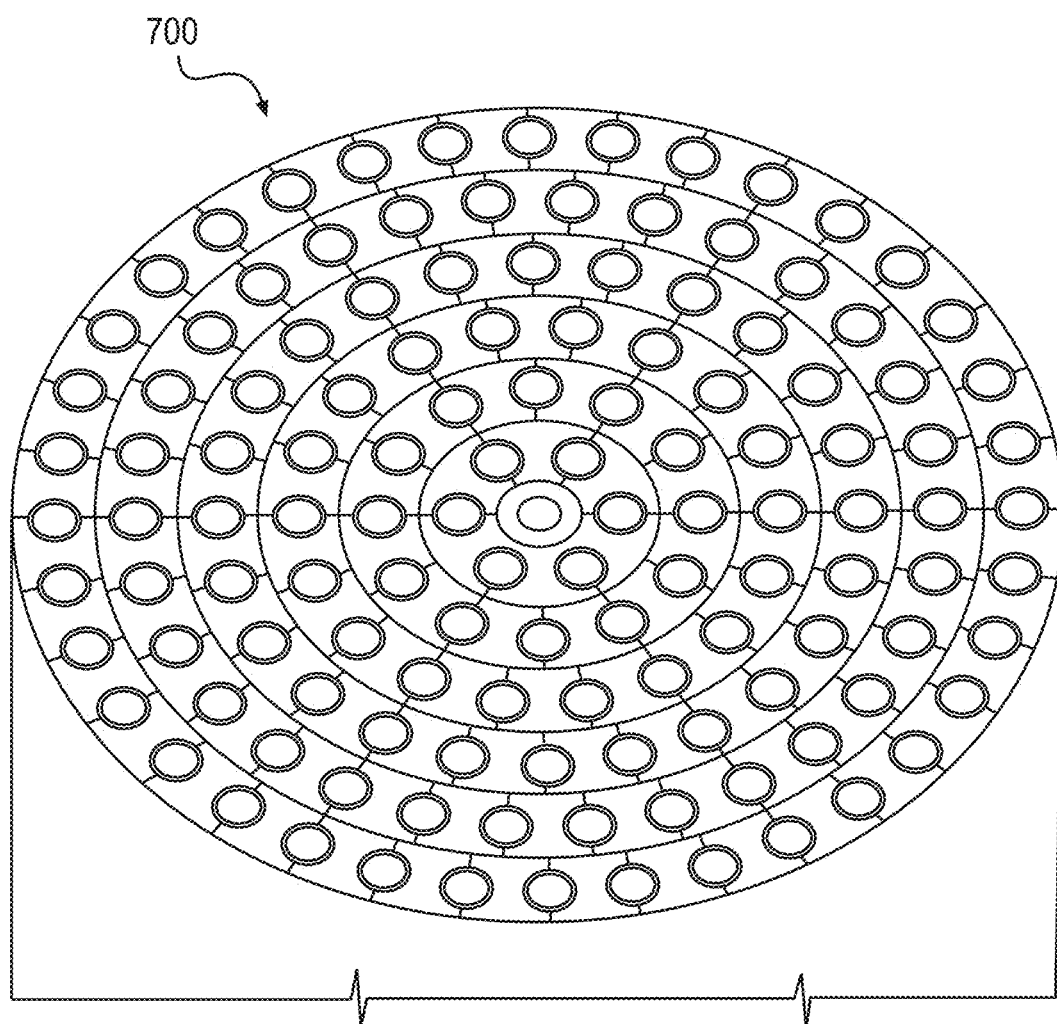
FIG. 12 shows an example of a solid CAD model resulting from the Universal Inverted Reactor Computational Platform process in Example 2.

Using the universal inverted reactor design as the base design (such as the design shown and described with respect to FIGS. 11A-B), solid models of the fuel, cladding, and passageways exist a priori. The UIRCP process calls a batch file that opens SolidWorks, runs sub-programs that update geometry global variables, runs a VBA (Visual Basic for Applications) program to suppress unwanted geometry, rebuilds the design with the new geometric parameters, and saves a one-sixth core parasolid. The parasolid 700 (see FIG. 12) is an example of a core parasolid resulting from the process. Note the similarity between this core parasolid 700 in FIG. 12 and the design of the reactor space 108 in FIG. FIGS. 3A-B, including the shell, axial cylinder, plurality of axially extending rings, plurality of primary axial tubes, primary channels, plurality of webbings and plurality of secondary channels. The UIRCP process and the Solid-Works modeling can vary and update number of rings, passageway size, fuel size, overall reactor size, and interstitial clad to optimize the universal inverted reactor design.

Figure 13:
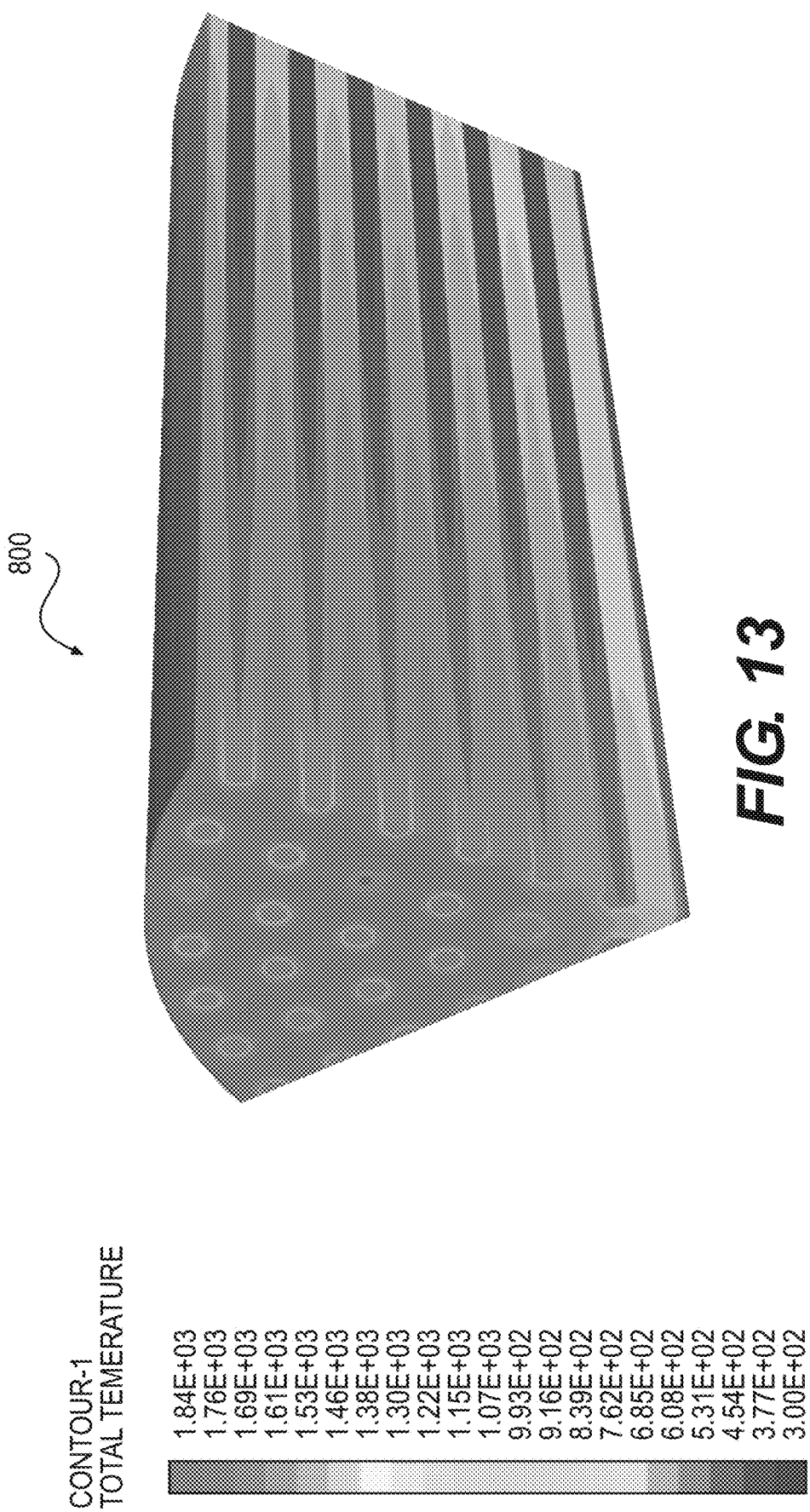
FIG. 13 is an example of a temperature contour map resulting from the Universal Inverted Reactor Computational Platform process in Example 2.

ANSYS was applied in the UIRCP process to solve a thermal-hydraulic problem in which the fuel produces heat that warms the coolant flowing through the passageways. A computational fluid dynamics (CFD) tool, such as ANSYS FLUENT, and a structural analysis tool, such as the finite element analysis (FEA) based ANSYS Mechanical, can be used. Using ANSYS FLUENT and ANSYS Mechanical, a j_script journal was called to insert the core parasolid, such as core parasolid 700, resulting from the UIRCP process applying SolidWorks. ANSYS mechanical was then opened to mesh the parasolid, differentiating between solid and fluid. A script was generated to control FLUENT; calling that script started by opening FLUENT. The script included referencing user inputs for the materials of the fuel, cladding, and coolant, which were then updated based on those inputs. Any mesh interfaces between the fuel and cladding were split (which prevents errant results that would otherwise result because the solid mesh would consider the interface as a uniform piece). The coolant inlets and outlets were set to the user input velocity and ambient temperature. Fuel elements were given the appropriate internal heat generation based on the MCNP output. FLUENT then ran a thermal-hydraulic simulation and produced a temperature contour map. FIG. 13 is an example of a temperature contour map 800 resulting from running FLUENT as outlined by the steps above.

The UIRCP process interfaced the ANSYS, SolidWorks, MCNP programs into a singular software automation in which the individual software iterates towards a final result based on a user's identified optimization technique. The interface operations were performed by saving the necessary information from one software's output, which waits until it is called while another software is being automated. For example, the SolidWorks and ANSYS programs communicate through solid modeling. After SolidWorks performs the geometry update and saves a parasolid, ANSYS calls that parasolid as a base geometry to perform the thermal-hydraulic analysis. In another example, the MCNP and ANSYS programs communicate via the relationship between fuel enrichments and radial thermal gradients. During the first iteration, MCNP runs the initial neutronic simulation using the initial fuel enrichment level for all fuel elements, this equates to an internal heat generation ($W/m^3$) per fuel element. The internal heat generation values are saved, waiting for ANSYS to call them. When ANSYS runs the thermal-hydraulic simulation, it saves the radial thermal profile. The thermal profile informs MCNP on what the next iteration enrichments will be in an attempt to trend towards a zero slope for radial thermal gradient (if that is the identified optimization technique). This process in repeated until an acceptable level of thermal gradient is reached. This acts as the main iterative loop for the UIRCP process.

Example 3

Figure 14A:
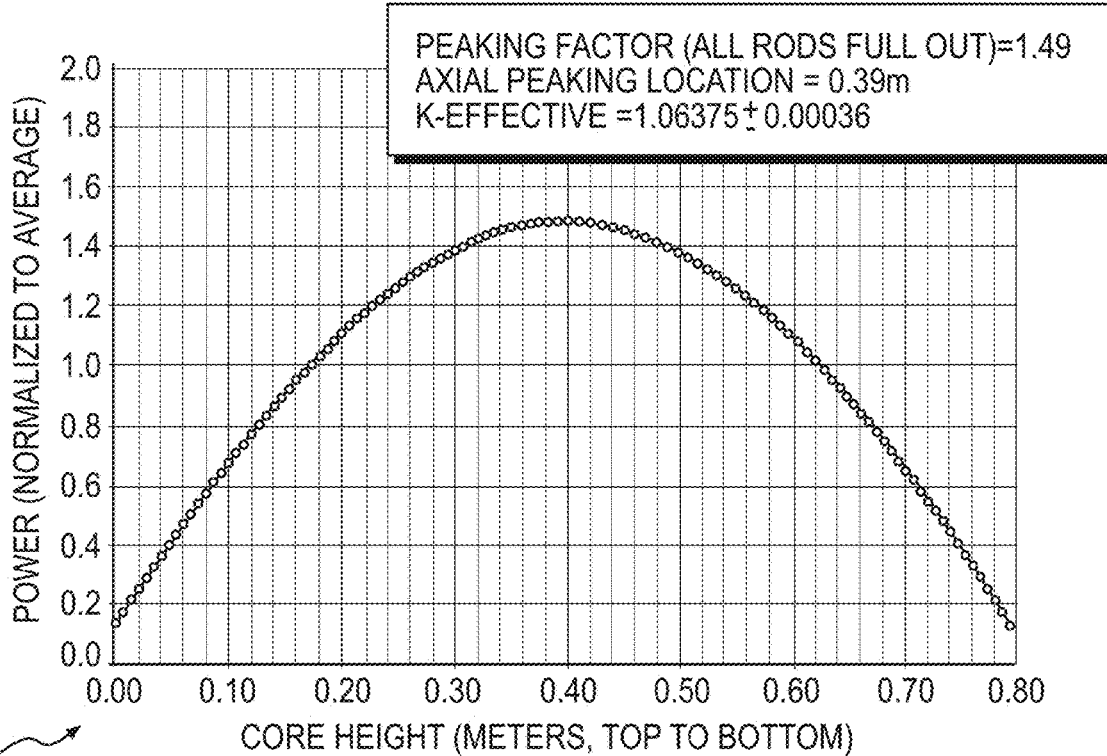
FIGS. 14A-C show profiles of temperature and neutronics associated with an exemplary embodiment of a fission reactor.
Figure 14B:
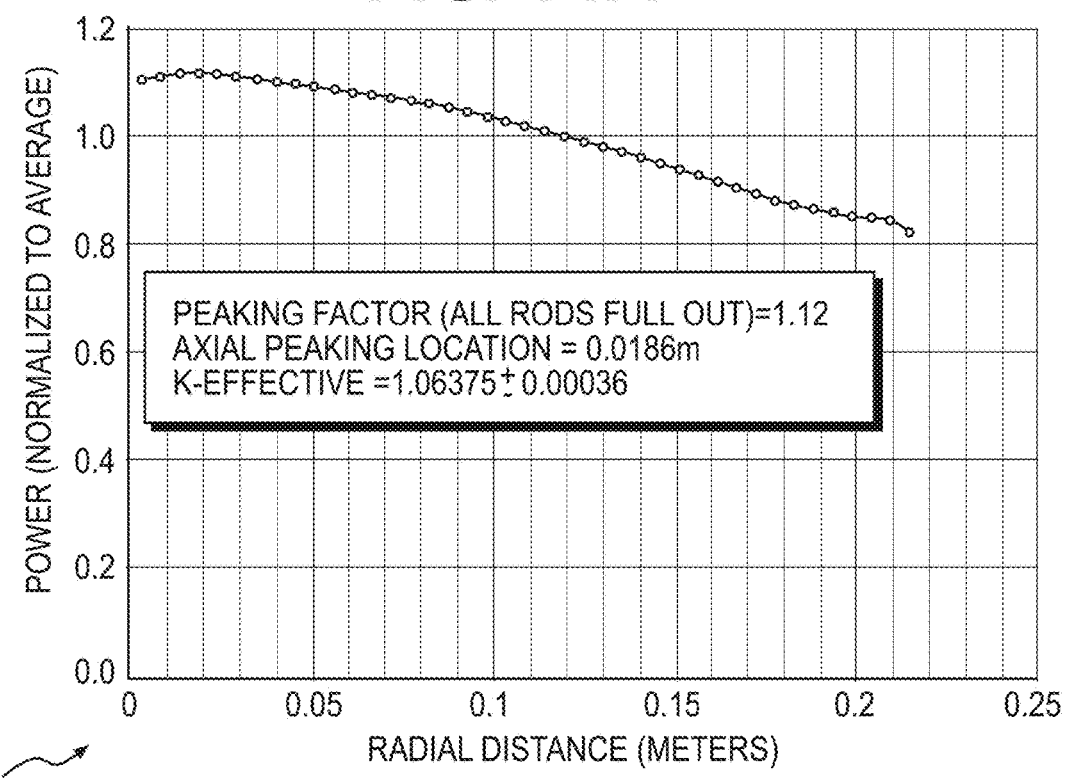
Figure 14C:
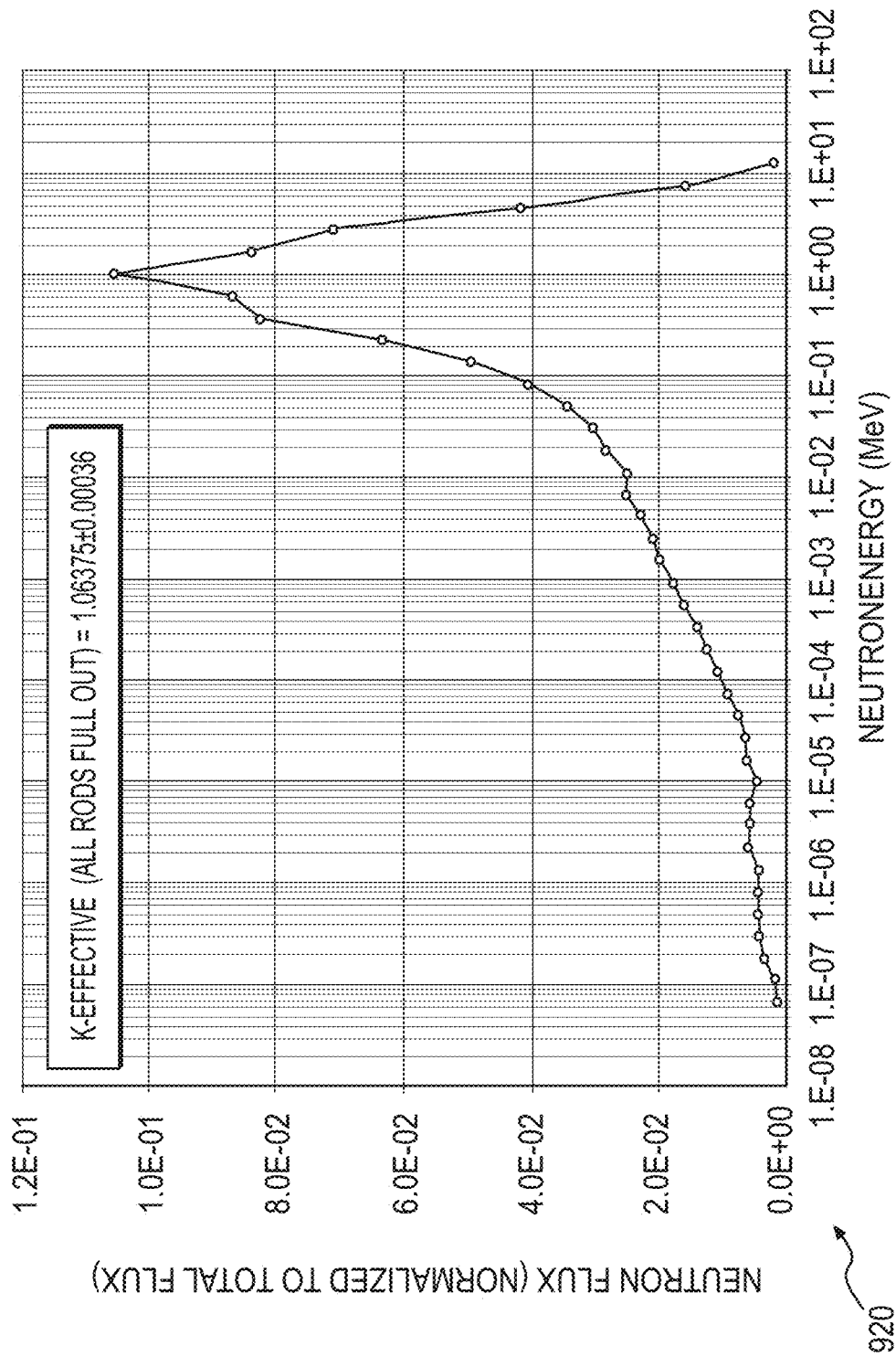

The neutronics of an example embodiment of the fission reactor 100 were investigated. The investigated fission reactor 100 utilized low enriched uranium (LEU) with 19.75 wt. % U-235. The fission reactor had 10 fuel rings located within the reactor space inside a shell. The core diameter was 434.7 mm and the core height was 800 mm. A 15 cm thick beryllium reflector surrounded the core. The neutronics were modeled using Monte Carlo N-Particle Transport Code 6 ("MCNP6") nuclear processes simulation program. It was determined that steady state operation (k-eff=1.0) would require a sequence of control rod maneuvers throughout the operational life of the core. FIGS. 14A and 14B show core power-peaking profiles from the MCNP6 nuclear processes simulation program when control rods are removed from the core. The profile 900 in FIG. 14A shows power (normalized to average) as a function of core height (meters, top to bottom) and has a peaking factor (all control rods fully withdrawn) of 1.49, an axial peaking location at 0.39 m, and a k-effective of 1.06375±0.00036 (control rods fully withdrawn). The profile 910 in FIG. 14B shows power (normalized to average) as a function of radial distance (meters) and has a peaking factor (all control rods fully withdrawn) of 1.12, an axial peaking location at 0.0186 m, and a k-effective of 1.06375±0.00036 (control rods fully withdrawn). FIG. 14C shows a profile 920 of neutron flux (normalized to total flux) as a function of neutron energy (MeV) and has a k-effective of 1.06375±0.00036 (all control rods fully withdrawn). For shutdown purposes, k-effective for the modeled reactor with control rods fully inserted was 0.94211±0.00034.

The UIRCP and the process described above gives engineers flexibility to change reactor type, materials, and base geometry. The final result is a reactor design that can be manufactured using additive manufacturing techniques and gives engineers a tool for a range of power applications. Additionally, specific features of the disclosed fission reactor can be optimized through dedicated routines in the UIRCP process. For example, in addition to enrichment optimization discussed above, the UIRCP process can be used to optimize: (a) passageway size, based on one or more of coolant substance heat transfer efficiency, radial thermal gradient, and axial thermal gradient; (b) ring width, for example, based on radial thermal gradient; and (c) cladding thickness, for example, based on radial thermal stresses.

Additionally, the UIRCP and the process described herein can be effectively applied to new reactor designs. Engineers are tasked to vet criticality, thermal-hydraulics, and material specifications. This initial project design and evaluation can take months (up to a year) and cost millions to obtain an initial answer on the viability of a new reactor design. However, the UIRCP and the process described herein provides thermal-hydraulic, neutronic, and geometric knowledge of a new reactor in a couple days. As a result, one can have a preliminary determination of the usability of a reactor design, and optimize that design, in reduced time and with reduced costs relative to current practices.

The fission reactor 100 in FIG. 2A has baseline characteristics including power output of 1 MWth (+250 kWe), ZrH moderated, Helium-cooled, Brayton thermodynamic cycle, and monolithic with rotationally symmetric. However, the fission reactor 100 can be larger or smaller, i.e., is scalable, and can have alternative characteristics as disclosed and described herein.

Fission reactors 100 disclosed herein can be used in suitable applications including, but not limited to, terrestrial power sources, remote power or off-grid applications, space power, space propulsion, isotope production, directed energy applications, commercial power applications, and desalination.

Although generally described herein in connection with a pressurized water reactor (PWR reactors) and with water as a primary coolant, the structures and methods disclosed herein can also be applicable to other reactor systems including boiling water reactors (BWR reactors), deuterium oxide (heavy water) moderator reactors such as CANDU reactors, light water reactors (LWR reactors), pebble bed reactors (PBR reactors), nuclear thermal propulsion reactors (NTP reactors), both commercial and research reactors, and utilize other primary coolants, such as helium, hydrogen, methane, molten salts, and liquid metals.

Although described herein using additive manufacturing techniques, subtractive manufacturing techniques as well as a combination of additive and subtractive manufacturing techniques can be employed to manufacture the fission reactor and related structures. As such, the in-situ techniques and predictive quality assurance methods can be adapted for use in such subtractive manufacturing/combination manufacturing environments. An example of subtractive manufacturing techniques include machining, such as milling and boring, a body to a rough, semi-finished shape followed by finish machining, such as electrical discharge machining (EDM). Other subtractive manufacturing methods can be used, such as electron beam machining (EBM).

Although described in connection with manufacturing the universal inverted reactor shown and described herein, the additive manufacturing methods and predictive quality assurance methods disclosed herein can be applied to the manufacture of other technologies, including in the petrochemical industries (for example, for chemical reaction vessels), in the aerospace industry (for example, for parts of turbines including turbine blades and housings, and for parts for missiles and rockets including combustion chambers, nozzles, valves, and coolant piping).

While reference has been made to specific embodiments, it is apparent that other embodiments and variations can be devised by others skilled in the art without departing from their spirit and scope. The appended claims are intended to be construed to include all such embodiments and equivalent variations.

What is claimed is:

1. A fission reactor, comprising:
a shell encompassing a reactor space having a longitudinal axis;
an axial cylinder including an inner diameter surface defining a central longitudinal channel having an axis that is co-located with the longitudinal axis of the reactor space;
a plurality of axially extending rings located within the reactor space and concentrically positioned relative to the axial cylinder, wherein the plurality of axially extending rings are radially separated forming, for any two adjacent axially extending rings, both a radially inward adjacent ring and a radially outward adjacent ring, and wherein an outer diameter surface of the radially inward adjacent ring and an inner diameter surface of the radially outward adjacent ring define an annular cylindrical space;
a first plurality of primary axial tubes located circumferential within the annular cylindrical space, wherein each primary axial tube includes an inner diameter surface forming a primary channel and an outer diameter surface;
a plurality of webbings, wherein the outer diameter surface of each of the plurality of primary axial tubes is connected to the radially inward adjacent ring by a first webbing and is connected to the radially outward adjacent ring by a second webbing;
a plurality of secondary channels within the cylindrical space, wherein circumferentially adjacent primary axial tubes are separated by one of the plurality of secondary channels; and
a fissionable nuclear fuel composition located in at least some of the plurality of secondary channels.

2. The fission reactor according to claim 1, wherein the fissionable nuclear fuel composition located in at least some of the plurality of secondary channels form a set of fissionable nuclear fuel elements that are volumetrically identical throughout the fission reactor.

3. The fission reactor according to claim 1, wherein a ratio of an area of a radial cross-section of the primary channels to an area of a radial cross-section of the secondary channels is constant throughout the fission reactor.

4. The fission reactor according to claim 1, wherein inner surfaces of the secondary channel include portions of the outer diameter surface of the circumferentially adjacent primary axial tubes, surfaces of the first webbing and the second webbing associated with each of the circumferentially adjacent primary axial tubes, and portions of the outer diameter surface of the radially inward adjacent ring and portions of the inner diameter surface of the radially outward adjacent ring.

5. The fission reactor according to claim 4, wherein the fissionable nuclear fuel composition is in thermal transfer contact with the inner surfaces of the secondary channel.

6. The fission reactor according to claim 1, wherein a primary coolant is flowable through the primary channel of each of the circumferentially adjacent primary axial tubes that are separated by one of the plurality of secondary channels which contain the fissionable nuclear fuel composition.

7. The fission reactor according to claim 1, wherein the circumferentially adjacent primary axial tubes are non-contactingly distributed within the annular cylindrical space.

8. The fission reactor according to claim 1, including a second plurality of primary axial tubes located circumferential between an inner diameter surface of the most radially inward, axially extending ring and an outer diameter surface of the axial cylinder, wherein the outer diameter surface of each of the second plurality of primary axial tubes is connected to the outer diameter surface of the axial cylinder by a first webbing and is connected to the most radially inward, axially extending ring by a second webbing.

9. The fission reactor according to claim 8, including a third plurality of primary axial tubes located circumferential between an inner diameter surface of the shell and an outer diameter surface of the most radially outward, axially extending ring, wherein the outer diameter surface of each of the third plurality of primary axial tubes is connected to the outer diameter surface of the most radially outward, axially extending ring by a first webbing and is connected to the inner diameter surface of the shell by a second webbing.

10. The fission reactor according to claim 9, wherein the shell, the axial cylinder, the plurality of axially extending rings, the plurality of primary axial tubes, and the plurality of webbings are an integral, unitary structure.

11. The fission reactor according to claim 10, wherein the shell, the axial cylinder, the plurality of axially extending rings, the plurality of primary axial tubes, and the plurality of webbings are formed from a metal alloy.

12. The fission reactor according to claim 1, wherein the shell, the axial cylinder, the plurality of axially extending rings, the plurality of primary axial tubes, and the plurality of webbings are an integral, unitary structure.

13. The fission reactor according to claim 12, wherein the shell, the axial cylinder, the plurality of axially extending rings, the plurality of primary axial tubes, and the plurality of webbings are formed from a metal alloy.

14. The fission reactor according to claim 1, including a reflector around an outer diameter surface of the shell.

15. The fission reactor according to claim 1, including at least one of a moderator, a control rod, and a scientific instrument is located in one or more primary channels.

16. The fission reactor according to claim 1, wherein the first plurality of primary axial tubes in each of the cylindrical space has a six-fold rotational symmetry relative to the longitudinal axis of the reactor space.

17. The fission reactor according to claim 1, wherein one or more of the central longitudinal channel of the axial cylinder and the primary channel of one or more of the primary axial tubes is accessible from an outer surface of the fission reactor.

18. The fission reactor according to claim 1, wherein the primary axial tube has a longitudinal axis that is parallel with the axis of the reactor.

19. The fission reactor according to claim 18, wherein the inner diameter surface of the primary axial tubes forming the primary channel varies as a function of axial position relative to the longitudinal axis of the primary axial tube.

20. The fission reactor according to claim 1, wherein the primary axial tubes are chambered.

21. The fission reactor according to claim 1, wherein a cross-section of the secondary channel perpendicular to the longitudinal axis has a shape of a cross-section of a hyperboloid of one sheet.

* * * * *